(12) United States Patent
Tanaka et al.

(10) Patent No.: US 6,621,938 B1
(45) Date of Patent: Sep. 16, 2003

(54) IMAGE CAPTURE APPARATUS AND METHOD

(75) Inventors: Keisuke Tanaka, Asaka (JP); Mikio Watanabe, Asaka (JP); Yoshiko Shiimori, Asaka (JP); Hitoshi Ueno, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/397,768

(22) Filed: Sep. 16, 1999

(30) Foreign Application Priority Data

Sep. 18, 1998 (JP) .......................................... 10-265147
Sep. 29, 1998 (JP) .......................................... 10-275601

(51) Int. Cl.[7] ................................................. G06K 9/36
(52) U.S. Cl. ....................................... 382/276; 345/473
(58) Field of Search ................................ 382/276, 295, 382/296, 293, 162; 345/619, 473

(56) References Cited

U.S. PATENT DOCUMENTS 5,745,668 A * 4/1998 Poggio et al. .............. 395/175
5,999,194 A * 12/1999 Brunelle ..................... 345/473
6,097,853 A * 8/2000 Gu et al. ..................... 382/282
6,373,492 B1 * 4/2002 Kroitor ....................... 345/473

* cited by examiner

Primary Examiner—Yon J. Couso
(74) Attorney, Agent, or Firm—McGinn & Gibb, PLLC

(57) ABSTRACT

In an apparatus for capturing the image of a user, transforming the image and then printing the transformed image, the user is notified of the manner in which the image will be transformed before the image is printed. To accomplish this, the transformed image of the user is displayed on a monitor display unit before it is printed. Thus the user can verify how the transformed image will look before it is printed. According to another aspect of the invention, when a captured image is transformed and displayed, the user is allowed to set the method of transformation and the degree thereof. To this end, the image of the user is captured and loaded into the image capture apparatus. A screen for setting shape and color transformations is displayed on the display unit of the image capture apparatus. By pressing buttons on the apparatus, the user changes the position and size of a small circle in a setting chart displayed in an area of the display screen. On the basis of intersections between the circumference of the small circle and three lines, defocusing of the captured image of the user, a sepia-tone color conversion and the degree of conversion of the eyes of the image are set.

10 Claims, 46 Drawing Sheets

Fig. 16

Header

Punching game(HEADER INFORMATION)

1.0.0(VERSION NO.)

Fig. 17

Default output

148×100(OUTPUT SIZE, WIDTH×HEIGHT)

Postcard(OUTPUT TYPE,A3,A4,A5,A6,Postcard...)

1(LANDSCAPE)(OUTPUT ORIENTATION: PORTRAIT,LANDSCAPE)

White(BACKGROUND COLOR)

Fig. 18

Layer List

```
5(NUMBER OF LAYERS)
  Layer Info[1]  0x0300(LAYER POINTER)
                 0021(SHAPE TRANSFORMATION 1 LAYER)(LAYER NAME)
                 1(DISPLAY ORDER)
                 1(DISPLAYABLE)(DISPLAY/NON-DISPLAY FLAG)
                 1(INTERCHANGEABLE)(INTERCHANGE ABLE/DISABLE FLAG)
                 1(INTERCHANGE NO.)
  Layer Info[2]  0x0350(LAYER POINTER)
                 0022(SHAPE TRANSFORMATION 2 LAYER)(LAYER NAME)
                 2(DISPLAY ORDER)
                 0(DISPLAYABLE)(DISPLAY/NON-DISPLAY FLAG)
                 1(INTERCHANGEABLE)(INTERCHANGE ABLE/DISABLE FLAG)
                 1(INTERCHANGE NO.)
  Layer Info[3]  0x0400(LAYER POINTER)
                 0023(SHAPE TRANSFORMATION 3 LAYER)(LAYER NAME)
                 3(DISPLAY ORDER)
                 0(DISPLAYABLE)(DISPLAY/NON-DISPLAY FLAG)
                 0(INTERCHANGEABLE)(INTERCHANGE ABLE/DISABLE FLAG)
                 1(INTERCHANGE NO.)
  Layer Info[4]  0x0450(LAYER POINTER)
                    .
                    .
                    .
```

Fig. 19

Layer Data 1

> 0x0320(LAYER-SPECIFIC INFORMATION POINTER)
> 0x0820(TRANSPARENCY MASK POINTER)
> 0x0840(POSITON INFORMATION POINTER)

Layer Specific Data1

> 1(Transformation)(LAYER CATEGORY)
> JPEG(FORMAT OF CAPTURED IMAGE)
> Input.jpg(POINTER OF CAPTURED IMAGE)
> 1.0 (MAXIMUM VALUE OF LAYER PARAMETER)
> 0.00(MINIMUM VALUE OF LAYER PARAMETER)

Layer Data 2

> 0x0370(LAYER-SPECIFIC INFORMATION POINTER)
> 0x0880(TRANSPARENCY MASK POINTER)
> 0x0900(POSITON INFORMATION POINTER)

Layer Specific Data2

> 1(Transformation)(LAYER CATEGORY)
> JPEG(FORMAT OF CAPTURED IMAGE)
> Input.jpg(POINTER OF CAPTURED IMAGE)
> 1.0 (MAXIMUM VALUE OF LAYER PARAMETER)
> 0.00(MINIMUM VALUE OF LAYER PARAMETER)

.
.
.
.
.

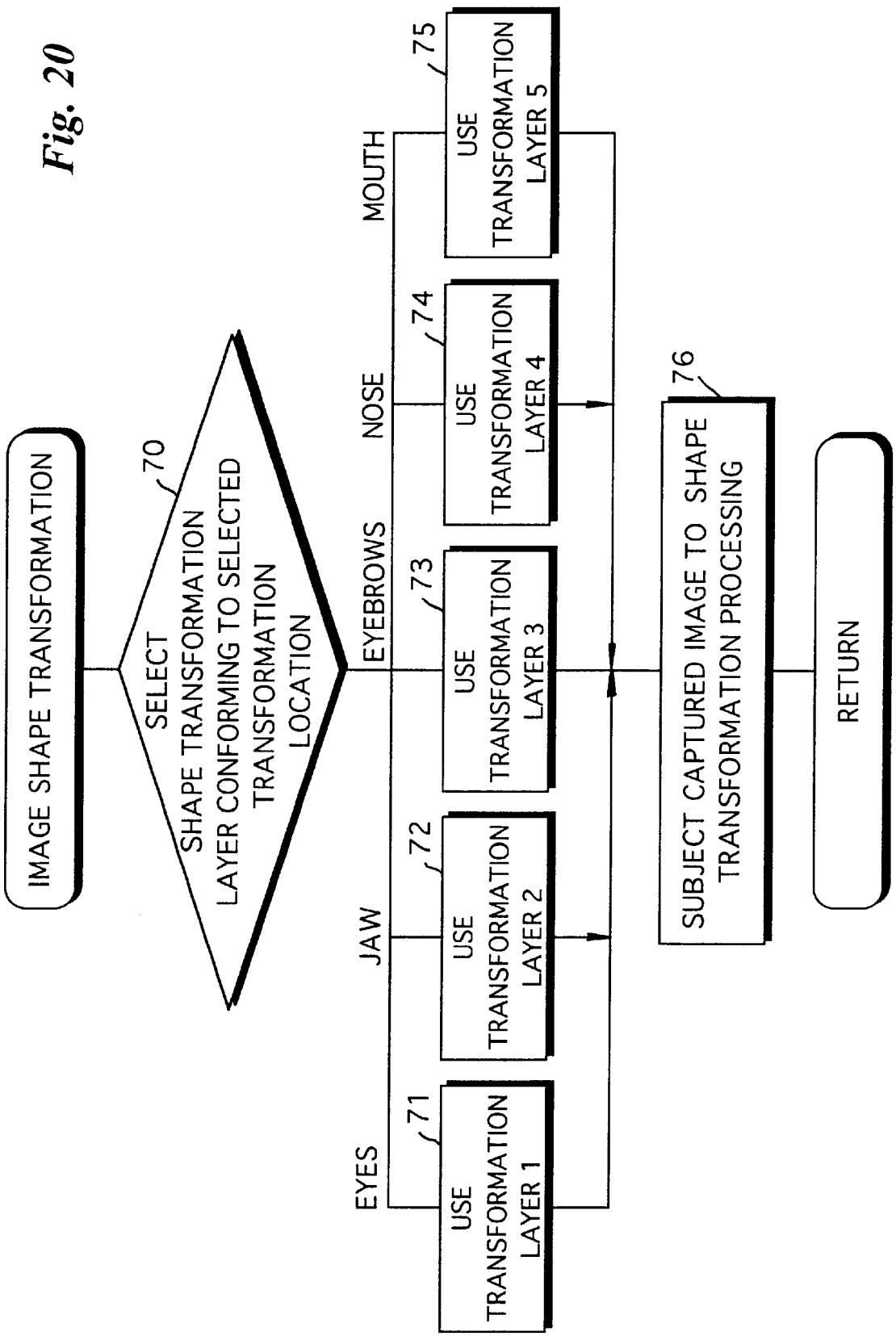

*Fig. 31a*     *Fig. 31b*
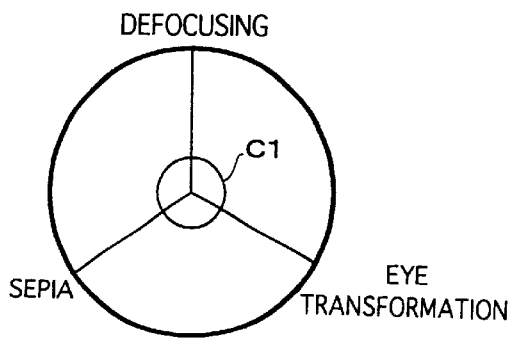 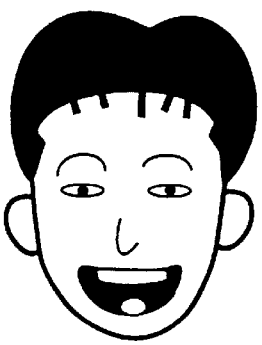
*Fig. 32a*     *Fig. 32b*
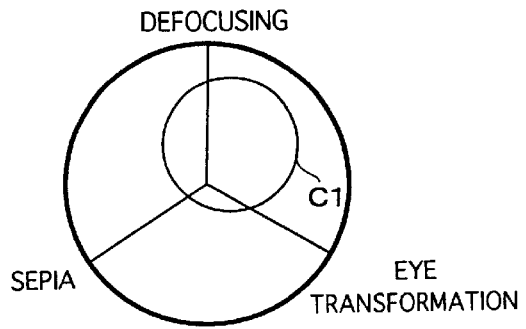 
*Fig. 33a*     *Fig. 33b*
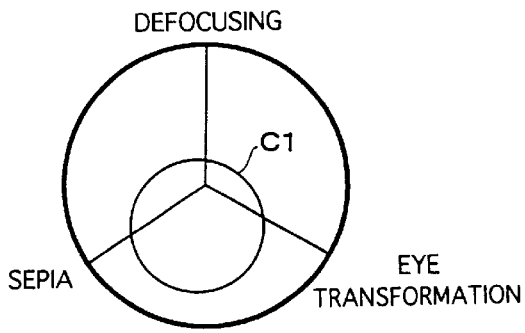 
*Fig. 34a*     *Fig. 34b*
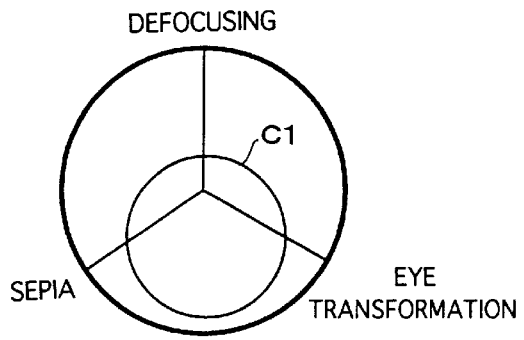 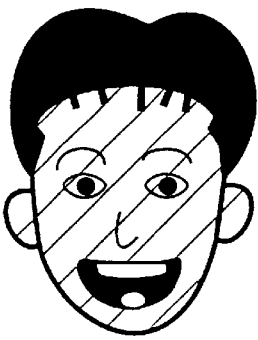

Fig. 35

| ADDRESS | IMAGE-PROCESSING DESCRIPTION FILE |
|---|---|
| 0x0000 | Header |
| 0x0020 | Default output |
| 0x0050 | Layer List<br><br>　Layer Info[1]<br>　　(DEFOCUSING)<br><br>　Layer Info[2]<br>　　(EYE TRANSFORMATION)<br><br>　Layer Info[3] (SEPIA) |
| 0x0300 | Layer Data 1 |
| 0x0320 | Layer Specific Data 1 |
| 0x0350 | Layer Data 2 |
| 0x0370 | Layer Specific Data 2 |
| | ⋮ |

*Fig. 36*

Layer List

```
5(NUMBER OF LAYERS)
  Layer Info[1]  0x0300(LAYER POINTER)
                 0021(SHAPE TRANSFORMATION 1 LAYER)(LAYER NAME)
                 1(DISPLAY ORDER)
                 1(DISPLAYABLE)(DISPLAY/NON-DISPLAY FLAG)
                 1(INTERCHANGEABLE)(INTERCHANGE ABLE/DISABLE FLAG)
                 1(INTERCHANGE NO.)
  Layer Info[2]  0x0350(LAYER POINTER)
                 0022(SHAPE TRANSFORMATION 2 LAYER)(LAYER NAME)
                 2(DISPLAY ORDER)
                 0(DISPLAYABLE)(DISPLAY/NON-DISPLAY FLAG)
                 1(INTERCHANGEABLE)(INTERCHANGE ABLE/DISABLE FLAG)
                 1(INTERCHANGE NO.)
  Layer Info[3]  0x0400(LAYER POINTER)
                 0023(SHAPE TRANSFORMATION 3 LAYER)(LAYER NAME)
                 3(DISPLAY ORDER)
                 0(DISPLAYABLE)(DISPLAY/NON-DISPLAY FLAG)
                 0(INTERCHANGEABLE)(INTERCHANGE ABLE/DISABLE FLAG)
                 1(INTERCHANGE NO.)
```

*Fig. 46*

| LAYER OF IMAGE-PROCESSING DESCRIPTION FILE | EXCLUSION FLAG |
|---|---|
| SHARPNESS PROCESSING LAYER | 00000000 |
| MONOCHROME CONVERSION PROCESSING LAYER | 00000001 |
| SEPIA COLOR TRANSFORMATION LAYER | 00000001 |

*Fig. 48*

| COUNT VALUE (RANDOM NUMBER) | IMAGE SHAPE TRANSFORMATION METHOD AND COLOR TRANSFORMATION METHOD |
|---|---|
| 0 ~ aaa | DEFOCUSING |
| aaa ~ bbb | SEPIA |
| bbb ~ ccc | EYE TRANSFORMATION |

*Fig. 49*

| TIME | IMAGE SHAPE TRANSFORMATION METHOD AND COLOR TRANSFORMATION METHOD |
|---|---|
| MORNING | DEFOCUSING |
| AFTERNOON | SEPIA |
| EVENING | EYE TRANSFORMATION |

*Fig. 50*

| SEASON | IMAGE SHAPE TRANSFORMATION METHOD AND COLOR TRANSFORMATION METHOD |
|---|---|
| SPRING | DEFOCUSING |
| SUMMER | SEPIA |
| AUTUMN | EYE TRANSFORMATION |
| WINTER | TRANSFORM SHAPE OF FACE |

*Fig. 52*

| COUNT VALUE (RANDOM NUMBER) | DEGREES OF SHAPE AND COLOR TRANSFORMATION |
|---|---|
| 0 ~ A | 1 (LOWEST) |
| A ~ B | 2 |
| B ~ C | 3 |
| C ~ D | 4 |
| D ~ E | 5 (HIGHEST) |

IMAGE CAPTURE APPARATUS AND METHOD

BACKGROUND OF THE INVENTION

1. Field of the Invention

This invention relates to an image capture apparatus and method for capturing an image of interest and subjecting the captured image of interest to at least one of shape transformation processing and color transformation processing.

2. Description of the Related Art

An apparatus which photographs a subject and prints an image representing the image of the subject on a seal or the like has become commercially practical. When the image of the subject obtained by such photography is to be altered in form using such an apparatus, it is not possible to verify what the transformed image will look like until after it is printed.

The apparatus often is used to photograph the face or entire body of the user and print the photograph on a seal. However, as there is not much fun involved in merely printing the image of the subject thus obtained by photography on a seal as is, the user can get bored with the process.

SUMMARY OF THE INVENTION

Accordingly, an object of the present invention is to make it possible for the user to verify what an image of interest after transformation will look like in a case where an image of interest is captured and transformed.

Another object of the present invention is to capture an image of interest by photography, subject the captured image of interest to shape or color transformation processing and output the result.

According to a first aspect of the present invention, the foregoing object is attained by providing an image capture apparatus comprising: a setting device for setting at least one of an image shape transformation method and image shape transformation location; an image capture device for capturing an image of interest; an image shape transformation processor (image shape transformation processing means) for subjecting the image of interest captured by the image capture device to at least one of image shape transformation processing that is based upon the image shape transformation method set by the setting device and image shape transformation processing of the image shape transformation location; and a display unit for displaying the image of interest after transformation by the image shape transformation processor.

The first aspect of the present invention provides also a method suited for the apparatus described above. Specifically, there is provided an image capture method comprising the steps of: setting at least one of an image shape transformation method and image shape transformation location; capturing an image of interest; subjecting the capture image of interest captured to at least one of image shape transformation processing that is based upon the image shape transformation method that has been set and image shape transformation processing of the image shape transformation location; and displaying the image of interest after transformation.

In accordance with the first aspect of the present invention, an image shape transformation method and an image shape transformation location are selected. In a case where the full length of the subject is photographed, examples of the transformation method include a method of transforming the full length of the image of the subject so as to fatten the image and a method of transforming the full length of the image of the subject so as to slim down the image. In a case where the upper half of the body of the subject is photographed, examples of the transformation method include a method of performing transformation so as to fatten the face of the subject and a method of performing transformation so as to slim down the face of the subject. In a case where the full length of the subject is photographed, examples of locations transformed include the image of the face, the image of the torso and the image of the lower half of the body of the subject. In a case where the upper half of the body of the subject is photographed, examples of locations transformed include portions of the face, such as the eyes, nose, mouth, lips and ears.

The image of interest (which may be the user himself or a photograph brought by the user) is captured by photography. The captured image is subjected to shape transformation by the image transformation method that has been set or the image location that has been set is subjected to shape transformation. The transformed image is displayed on the display unit. The user observes the image displayed on the display unit and is capable for verifying what the image of interest will look like after shape transformation. The transformed image thus verified is printed.

When the method of shape transformation has been predetermined, it will suffice to set the transformation location. When the transformation location has been predetermined, it will suffice to set the method of shape transformation. It goes without saying that an arrangement may be adopted in which both the transformation method and transformation location can be set.

Further, an arrangement may be adopted in which the color represented by the captured image is altered rather than the shape of the captured image. In a case where color is altered, the color of the entire captured image or the color of a part of the captured image may be altered.

According to a second aspect of the present invention, the foregoing object is attained by providing an image capture apparatus comprising: an image capture device for capturing an image of interest; a setting device for setting at least one of processing relating to shape transformation and processing relating to color transformation of the image of interest captured by the image capture device; an image shape/color transformation device (image shape/color transformation means) for subjecting the image of interest captured by the image capture device to the processing set by the setting device; and an output device for outputting image data representing the image processed by the image shape/color transformation device.

The second aspect of the present invention provides also a method suited for the apparatus described above. Specifically, there is provided an image capture method comprising the steps of: capturing an image of interest; setting at least one of processing relating to shape transformation and processing relating to color transformation of the captured image of interest; subjecting the captured image of interest to the processing that has been set; and outputting image data representing the image processed.

Setting of the processing relating to shape transformation includes setting of type of shape transformation (shape transformation processing for enlarging width and shape transformation processing for reducing width), setting of shape transformation location and setting of degree of shape transformation, etc. Setting of processing relating to color transformation includes setting of type of color transformation (monochrome conversion processing, processing for conversion to sepia-toned color), setting of color transformation location and setting of degree of color transformation, etc.

In accordance with the second aspect of the present invention, the image capture apparatus is capable of executing a plurality of processing operations such as the processing relating to shape conversion and the processing relating to color transformation. At least one of these processing operations is set. If an image of interest is captured as by photography, the processing that has been selected is applied to the captured image. The apparatus outputs image data representing an image of interest whose shape has been transformed, an image of interest whose color has been transformed, etc.

Since image data representing a captured image of interest is not merely output, is instead output after being subjected to shape transformation processing or color transformation processing. As a result, the user will not lose interest in the apparatus that easily even when the images are merely printed on seals.

An arrangement may be adopted in which the image capture apparatus itself or the user of the apparatus himself or herself sets the processing executed, such as the processing relating to shape transformation and the processing related to color transformation.

In a case where the processing such as the processing relating to shape transformation and the processing relating to color transformation is set by the user himself, the apparatus would be further provided with command input device for inputting a processing command concerning at least one of processing relating to shape transformation and processing relating to color transformation, and the setting device would perform the setting based upon the command input from the command input device.

Thus, the user himself is capable of setting the desired processing selected from the processing relating to shape transformation and the processing relating to color transformation.

The command input device may be a mechanical button for setting the processing relating to shape transformation and the processing relating to color transformation, and an arrangement may be adopted in which a processing setting button is graphically displayed on the display screen of the display unit, a touch-sensitive panel is formed on the display screen and a command is entered from the touch-sensitive panel.

The command input device can be made a single operating device for setting at least two processing operations in processing relating to shape transformation and processing relating to color transformation.

Thus, a plurality of processing operations in processing relating to shape transformation and processing relating to color transformation can be set by a single operating device. This makes it comparatively simple to set a plurality of processing operations.

The apparatus further comprises a storage device in which there is stored, in advance, overlapped-setting prohibited processing, which is processing in the processing relating to shape transformation and processing relating to color transformation that cannot be set to overlap other processing; and a command-input invalidation device (command-input invalidation means) which, on the basis of the overlapped-setting prohibited processing stored in advance, invalidates, from commands entered from the command input device, input of a command calling for execution of the overlapped-setting prohibited processing that has been stored in the storage device.

In a case where a plurality of processing operations such as processing relating to shape transformation and processing relating to color transformation are available, processing exists that would result in a contradiction if a plurality of processing operations were executed simultaneously. For example, when monochrome-image conversion processing is executed, this cannot be followed by image conversion processing for conversion to a sepia tone. In regard to processing that cannot be set to overlap other processing, such processing is stored in a memory beforehand as overlapped-setting prohibited processing. If a command is entered from the command input device to execute processing that is such overlapped-setting prohibited processing stored in advance, input of the command is invalidated.

The apparatus further comprises a display unit for displaying, in a prescribed area, settable processing of the processing relating to shape transformation and processing relating to color transformation, wherein the command input device has coordinate input device for inputting coordinates on the area, and at least one processing operation of processing relating to shape transformation and processing relating to color transformation is set based upon the coordinates input from the coordinate input device.

Thus, while observing a plurality of processing operations displayed on the display screen of the display unit, the user is capable of selecting the desired processing from the plurality thereof.

The command input device may include a display control device (display control means) for controlling the display unit so as to display a circle the center of which is the coordinates input from the coordinate input device; a size input device for inputting the size of the circle; and a degree-of-processing decision device (degree-of-processing decision means) for deciding the degree of processing, which has been set by the setting device, based upon the circle that has been input from the size input device.

It is preferred that the processed image of interest be displayed on the display screen of the display unit. Desired processing can be set from the plurality of processing operations by inputting coordinate values from the coordinate input device. For example, a circle is displayed and processing is set based upon the position of the circle. The degree of processing is decided based upon the size of the circle entered from the size input device. While observing the display device, the user can set the processing as well as the degree of processing. Thus, the apparatus is very easy to operate.

The apparatus may be provided with a timer for measuring time, wherein on the basis of the result of time measurement by the timer, the setting device sets at least one of the processing relating to shape transformation and processing relating to color transformation of the image of interest captured by the image capture device.

Thus, without relying upon a setting made by the user, it is possible to set at least one of the processing relating to shape transformation and processing relating to color transformation of the image of interest. This makes it possible to obtain an image of interest that has undergone unexpected processing that does not depend upon the volition of the user.

The apparatus may be provided with a random-number generating device (random-number generating means) for generating a random number, wherein on the basis of the random number generated by the random-number generating device, the setting device sets at least one of the processing relating to shape transformation and processing relating to color transformation of the image of interest captured by the image capture device.

In this case also it is possible to obtain an image of interest that has undergone unexpected processing that does not depend upon the volition of the user.

According to a third aspect of the present invention, the foregoing object is attained by providing an image capture apparatus comprising: an image capture device for capturing an image of interest; an image shape transformation device (image shape transformation means) for transforming the shape of the image of interest captured by the image capture device; and an output device for outputting image data representing the image of interest that has been subjected to shape transformation processing by the image shape transformation device.

The third aspect of the present invention provides also a method suited for the apparatus described above. Specifically, there is provided an image capture method comprising the steps of: capturing an image of interest; applying shape transformation processing to the image of interest that has been captured; and outputting image data representing the image of interest that has been subjected to shape transformation processing.

In accordance with the third aspect of the present invention, an image of interest is captured as by photography. The captured image is subjected to shape transformation processing and the image of interest thus processing is output. Since an image which is the result of transforming the shape of the image of interest is obtained in accordance with the third aspect of the invention as well, the user will not readily lose interest in the apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 illustrates a header;

FIG. 17 illustrates default output;

FIG. 18 illustrates a layer list;

FIG. 19 illustrates layer data and layer-specific data;

FIG. 20 is a flowchart illustrating the procedure of processing for transforming the shape of an image;

FIG. 31a illustrates a setting chart and FIG. 31b a captured image transformed in shape and color using the setting chart of FIG. 31a;

FIG. 32a illustrates a setting chart and FIG. 32b a captured image transformed in shape and color using the setting chart of FIG. 32a;

FIG. 33a illustrates a setting chart and FIG. 33b a captured image transformed in shape and color using the setting chart of FIG. 33a;

FIG. 34a illustrates a setting chart and FIG. 34b a captured image transformed in shape and color using the setting chart of FIG. 34a;

FIG. 35 illustrates an image-processing description file;

FIG. 36 illustrates a layer list;

FIG. 46 illustrates the relationship between layers of an image-processing description file and an exclusion flag;

FIG. 48 is a table showing the relationship between a count value and methods of image shape transformation and image color transformation;

FIG. 49 is a table showing the relationship between time at which the image capture apparatus is utilized and methods of image shape transformation and image color transformation;

FIG. 50 is a table showing the relationship between season in which the image capture apparatus is utilized and methods of image shape transformation and image color transformation;

FIG. 52 is a table showing the relationship between a count value and degrees of image shape transformation and image color transformation.

DESCRIPTION OF THE PREFERRED EMBODIMENTS (1) First Embodiment

Figure 1:
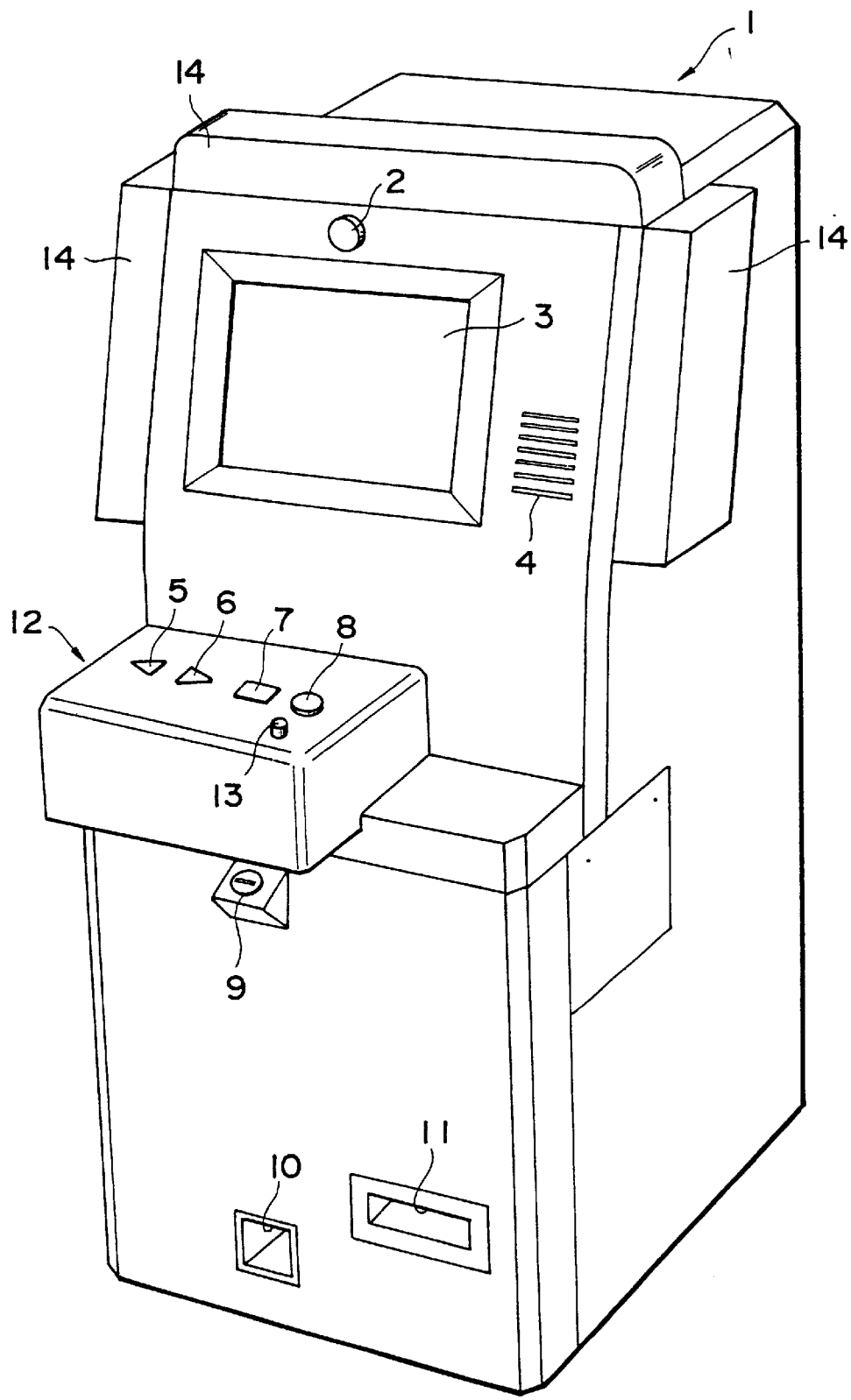
FIG. 1 is a perspective view showing the appearance of an image capture apparatus.

FIG. 1 is a perspective view showing an image capture apparatus 1 according to a first embodiment of the present invention.

The image capture apparatus 1 captures the image of a subject representing a user (the subject), transforms the shape of all or part of the image of the subject, displays the transformed image and prints the image.

The image capture apparatus 1 includes a video camera 2 disposed on the upper part of the front side substantially at the center thereof. The user stands in front of the image capture apparatus 1, faces the video camera 2 and is photographed by the video camera 2.

Provided below the video camera 2 is a monitor display device 3 having a display screen on which the image of the subject shot by the video camera 2 is displayed as a moving picture.

Provided on the right side of the monitor display device 3 is a speaker 4 for outputting operating instructions in the form of a voice. The user operates the image capture apparatus 1 in accordance with the voice output by from the speaker 4. Fluorescent lamps 14 for illuminating the user shot by the video camera 2 are provided on the top, left and right sides of the image capture apparatus 1.

The image capture apparatus 1 is formed to include a forwardly protruding control panel 12 on its front side approximately at the center thereof. The control panel 12 is formed to include a left button 5 and a right button 6 for selecting an image shape transformation method and an image transformation location, etc., as will be described later, an OK button 7 pressed by the user when a selection is to be entered, and a cancel button 8 for canceling a selection.

Formed below the control panel 12 is a coin insertion slot 9 in which the user inserts a coin as a user fee when the image capture apparatus 1 is used.

A coin return slot 10 is provided in the front side of the image capture apparatus 1 at the lower part thereof. A coin that has been dropped into the coin insertion slot 9 is returned from the coin return slot 10 by pressing a coin return button 13 before the image of the subject is printed.

Provided to the right of the coin return slot 10 is a print dispensing port 11 for dispensing prints obtained by photography.

Though the various buttons 5, 6, 7 and 8 are mechanical buttons, these may be formed as a touch-sensitive panel on the monitor display device 3. Further, it is possible to newly provide a display unit separate from the monitor display device 3 and to form a touch-sensitive panel on this separate display unit for the purpose of applying commands from the buttons 5, 6, 7 and 8.

Figure 2:
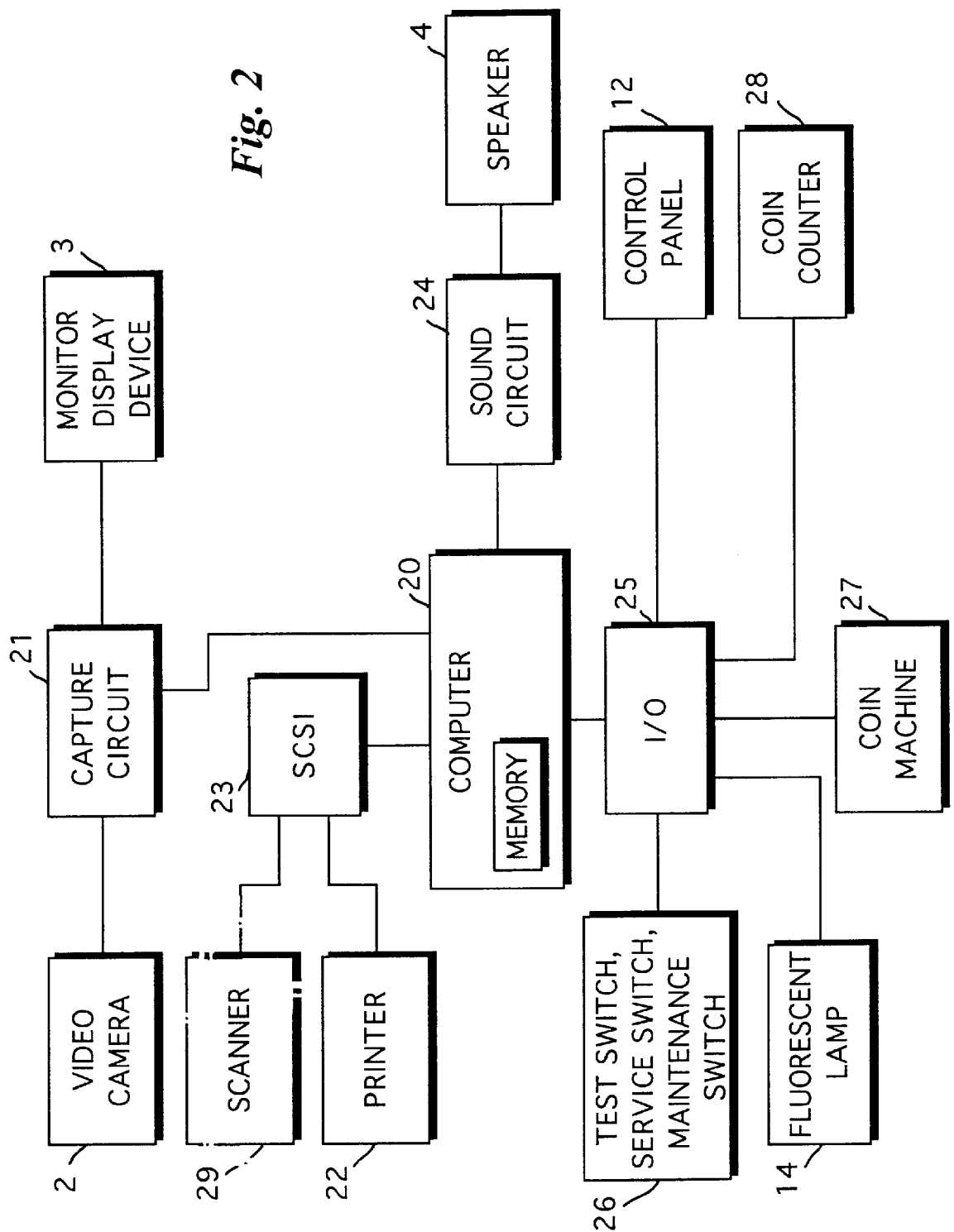
FIG. 2 is a block diagram showing the electrical construction of the image capture apparatus.

FIG. 2 is a block diagram illustrating part of the electrical construction of the image capture apparatus The overall operation of the image capture apparatus 1 is supervised by a computer 20. The latter includes a memory for storing operation programs, data representing a shape transformation location and other necessary data.

When a coin is inserted from the coin insertion slot 9 (see FIG. 1), the coin is introduced to a coin machine 27, which holds the introduced coin. The cash value of coins introduced is counted by a coin counter 28.

If coins having a cash value required for use of the image capture apparatus 1 have been inserted, then the video camera 2 starts shooting the user standing in from the image capture apparatus 1. A video signal representing the image of the user is supplied from the video camera 2 to a capture circuit 21, which converts the video signal to digital image data. The digital image data representing the image of the user is input to the computer 20, where the data is subjected to image shape transformation processing if necessary. The digital image data is stored temporarily in the memory incorporated in the computer 20.

Digital image data representing the image of the user is read out of the memory incorporated in the computer 20 and is input to the monitor display device 3 via the capture circuit 21. The image representing the user is displayed on the display screen of the monitor display device 3.

A signal indicating that a button provided on the control panel 12 has been pressed is input to the computer 20 via an I/O (input/output) unit 25. The computer 20 executes processing (image shape transformation processing, image freeze processing, etc.) based upon the input signal. By pressing the OK button 7 when an indication to print is displayed on the monitor display device 3, the user causes his or her transformed image to be printed by a printer 22 connected to an SCSI (Small Computer System Interface) 23.

A sound circuit 24 is connected to the computer 20. A voice output from the speaker 4 is controlled by the sound circuit 24. Light emitted from the fluorescent lamps 14 also is controlled by the computer 20 via the I/O unit 25. The image capture apparatus 1 is provided with test, service and maintenance switches 26 for maintaining the image capture apparatus 1. Signals indicating setting of the switches 26 are input to the computer 20 via the I/O unit 25.

The image capture apparatus 1 may be provided with a scanner 29 by which an image representing a photograph or the like can be scanned into the image capture apparatus 1. An image representing an image is output by the scanner 29 and input to the computer 20 via the SCSI 23, where the capture image can be subjected to a shape transformation. A film scanner may of course be provided so that an image that has been recorded on film can be read. An arrangement may be adopted in which a memory-card reader or FD (floppy disk) drive is provided so that an image represented by image data stored on the memory card or on the floppy disk can be read.

Figure 3:
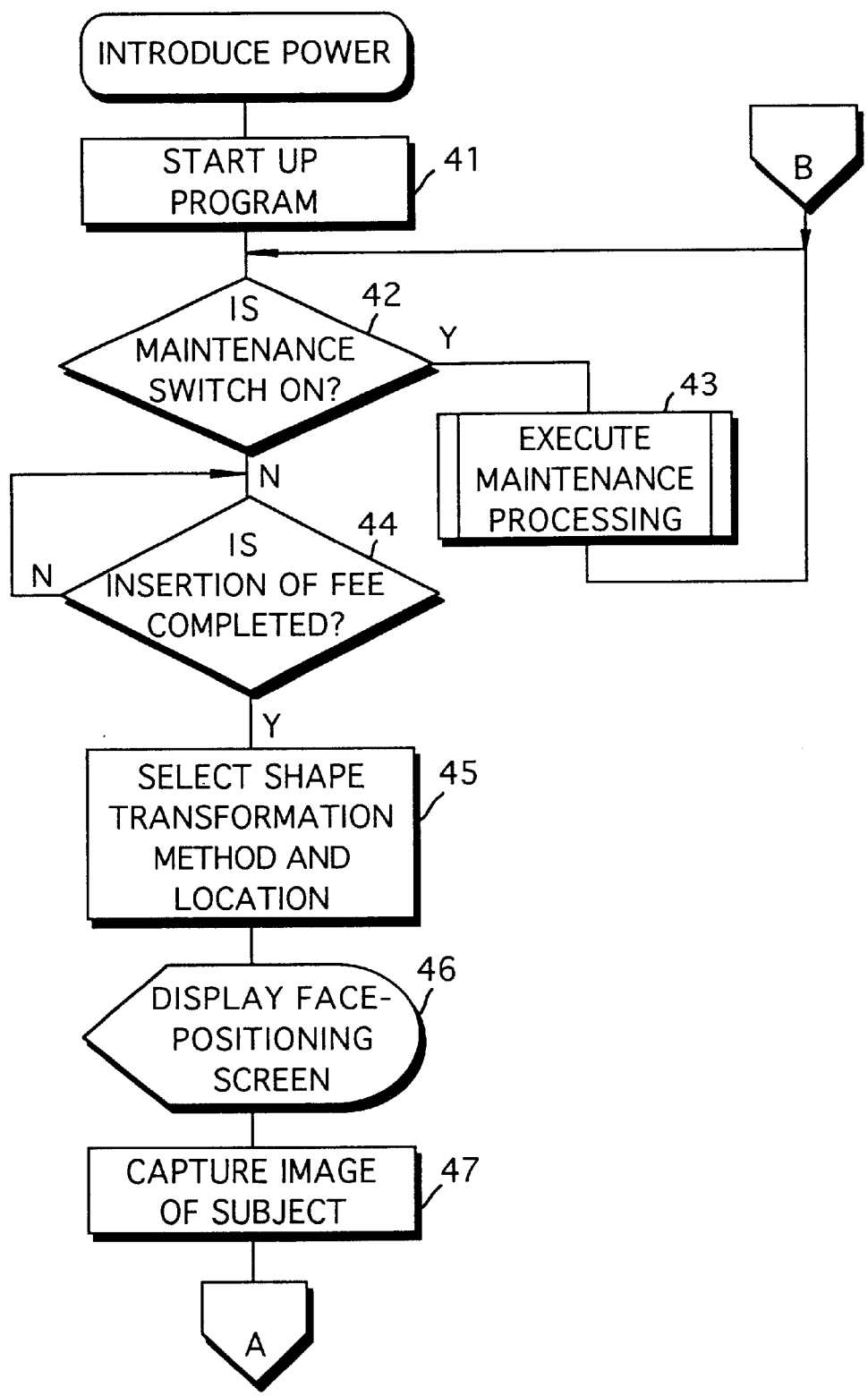
FIGS. 3 and 4 are flowcharts illustrating a processing procedure for transforming the shape of an image.
Figure 4:
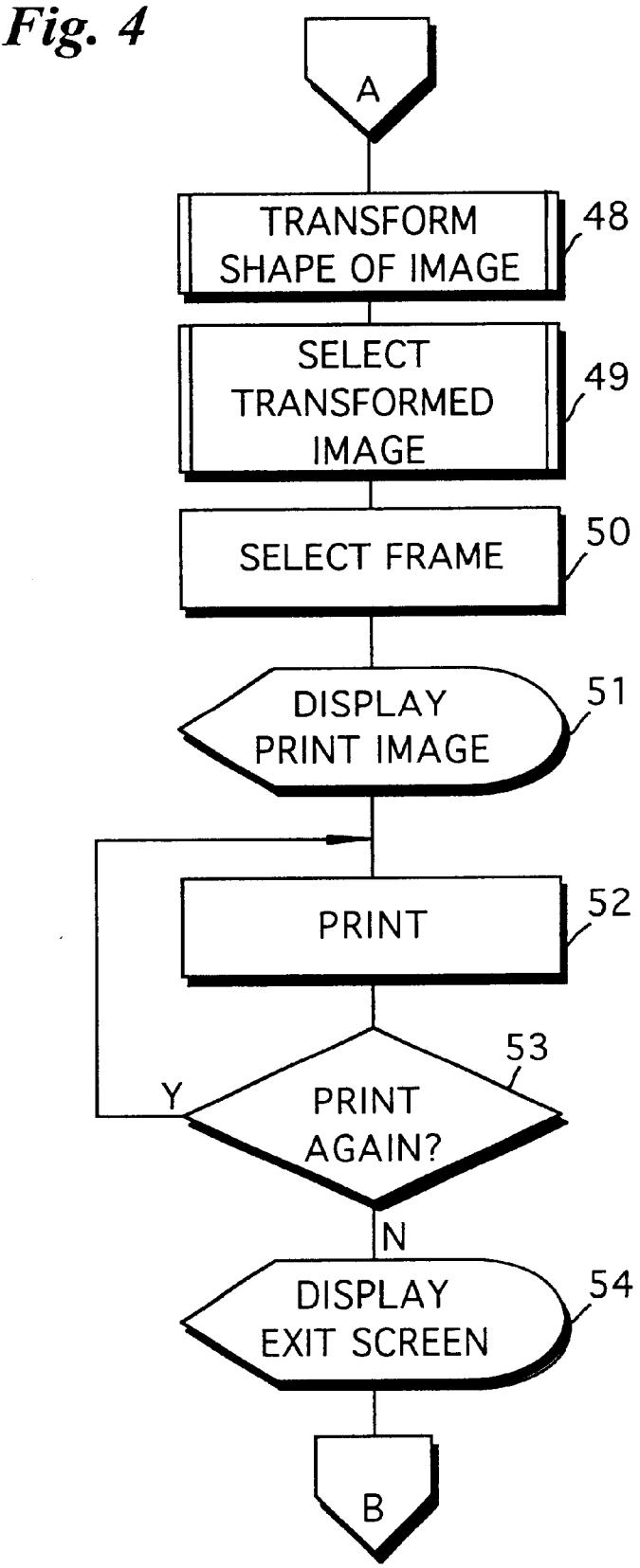
Figure 5:
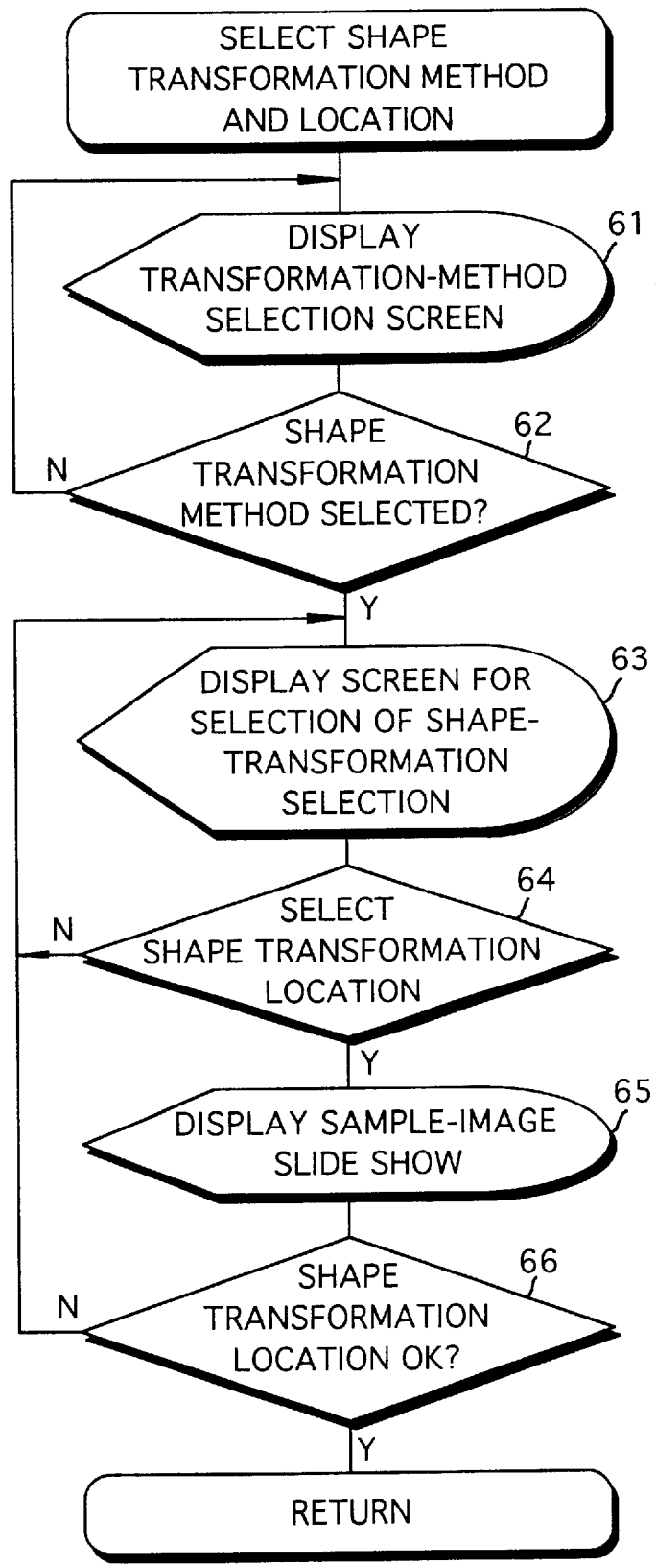
FIG. 5 is a flowchart illustrating a processing procedure for selecting a shape transformation method and a location at which transformation is to be performed.
Figure 6:
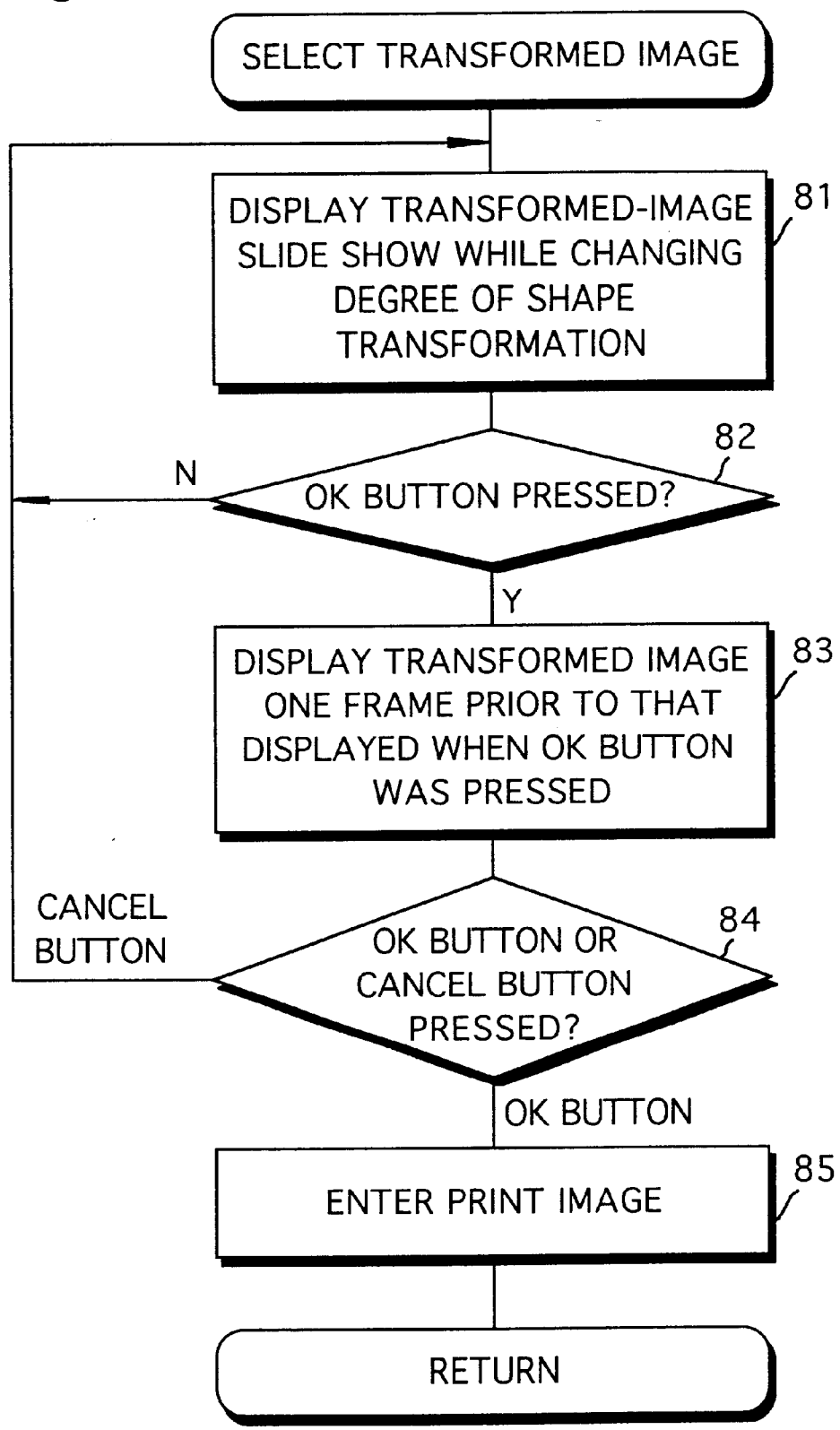
FIG. 6 is a flowchart illustrating a processing procedure for selecting an image whose shape has been transformed.

FIGS. 3 and 4 are flowcharts illustrating the procedure of processing executed by the image capture apparatus 1, FIG. 5 is a flowchart illustrating a processing procedure for selecting a shape transformation method and a location at which transformation is to be performed, FIG. 6 is a flowchart illustrating a procedure for processing a transformed image, and FIGS. 7 to 14 illustrate examples of display screens represented by the monitor display device 3 of the image capture apparatus 1.

When power is introduced to the image capture apparatus 1, the processing shown in FIGS. 3 and 4 begins.

The program for operating the computer 20 is started up by introducing power (step 41). It is determined whether the maintenance switch has been turned on (step 42). If the maintenance switch has been turned on ("YES" at step 42), the image capture apparatus 1 is subjected to maintenance processing by a maintenance man (step 43).

When the operating program of the image capture apparatus 1 is started up, a screen prompting the user to insert coins is displayed on the display screen of the monitor display device 3. The user responds by dropping coins corresponding to the user fee into the coin insertion slot 9. When dropping of the coins is confirmed by the coin counter 28 ("YES" at step 44), a screen of the type shown in FIG. 7 for selecting an image shape transformation method is displayed on the display screen of the monitor display device 3 (step 45, and step 61 in FIG. 5).

The screen for selecting the shape transformation method includes buttons (areas) A1, A2 and A3 for selecting the shape transformation method. The button A1 is one selected by the user in a case where a captured image is to have its shape transformed in an attractive manner. The button A2 is one selected by the user in a case where a captured image is to have its shape transformed in an entertaining manner (as by increasing the degree of shape transformation). The button A3 is one selected by the user in order to combine background with the captured image.

Figure 7:
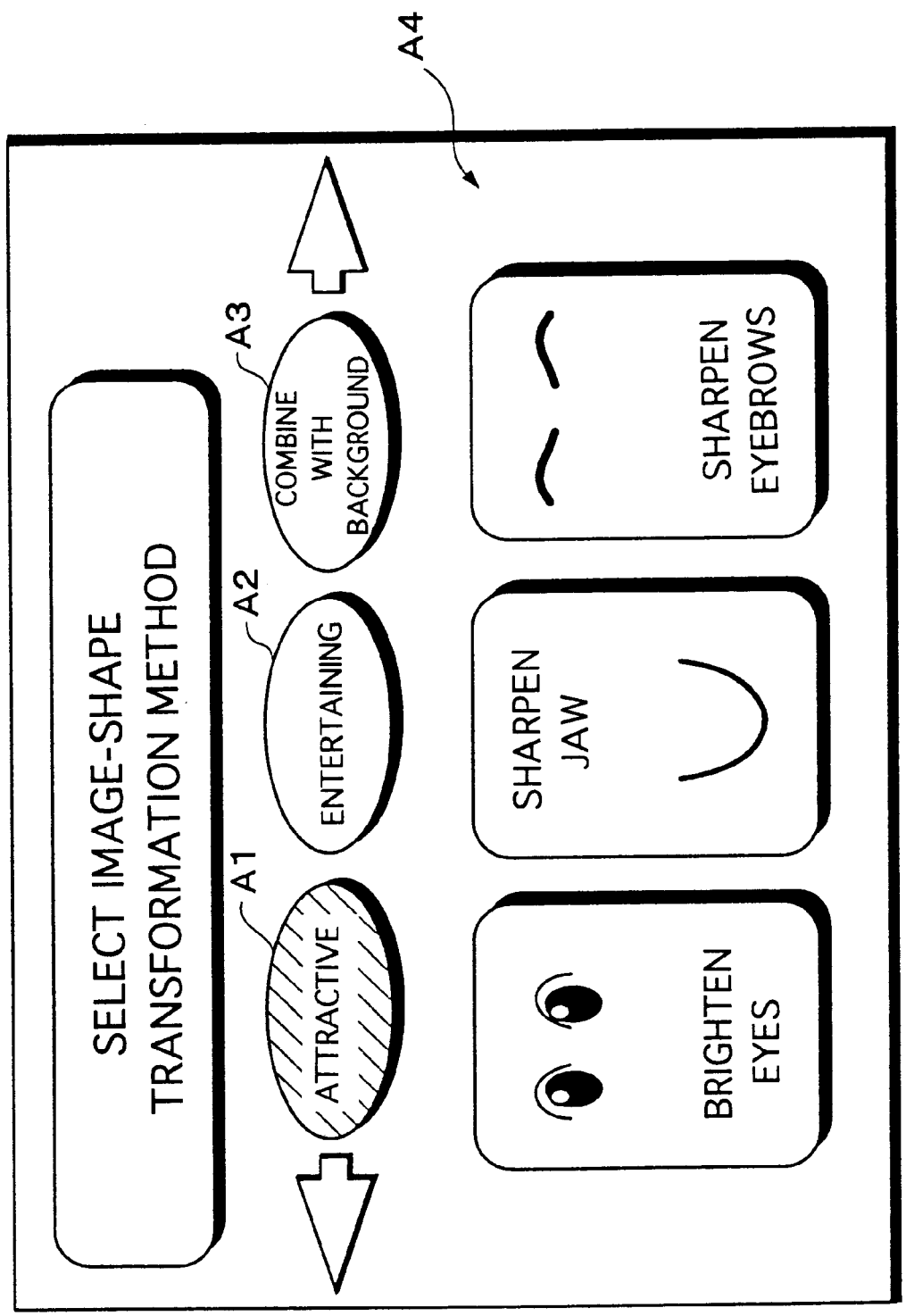
FIGS. 7 and 8 show examples of display screens.

A button that is capable of being selected flashes (this is indicated by the hatching in FIG. 7). By pressing the OK button 7, the user enters the image shape transformation method being indicated by the flashing button (step 62 in FIG. 5). In the example of FIG. 7, the button A1 is flashing. By pressing the OK button 7 in a state in which the button A1 is thus flashing, an image shape transformation method is decided so as to render the captured image in an attractive manner. Pressing the OK button 7 causes the display screen of the monitor display device 3 to change over to a screen shown in FIG. 8 that is for selecting a location at which the transformation is to be performed (step 63 in FIG. 5).

If the left button 5 or right button 6 is pressed in a state in which the button for deciding the image shape transformation method is flashing in the manner shown in FIG. 7, buttons other than the buttons displayed on the screen for selection of the shape transformation method appear on the selection screen. An image shape transformation method determined by a newly appearing button can be selected and entered.

The content of the image shape transformation indicated by the flashing button is displayed in an area A4 below the buttons A1, A2 and A3 on the screen for selection of the transformation method. For example, the button A1 is selected by the user if the user wishes to display a captured image in an attractive manner. When the button A1 is flashing, therefore, this indicates that shape transformation processing of the captured image will be executed to "BRIGHTEN EYES", "SHARPEN JAW" and "SHARPEN EYEBROWS". It goes without saying that when a button other than A1 is flashing, a description of the content of image shape transformation that will be set by the flashing button will be displayed in the area A4.

Figure 8:
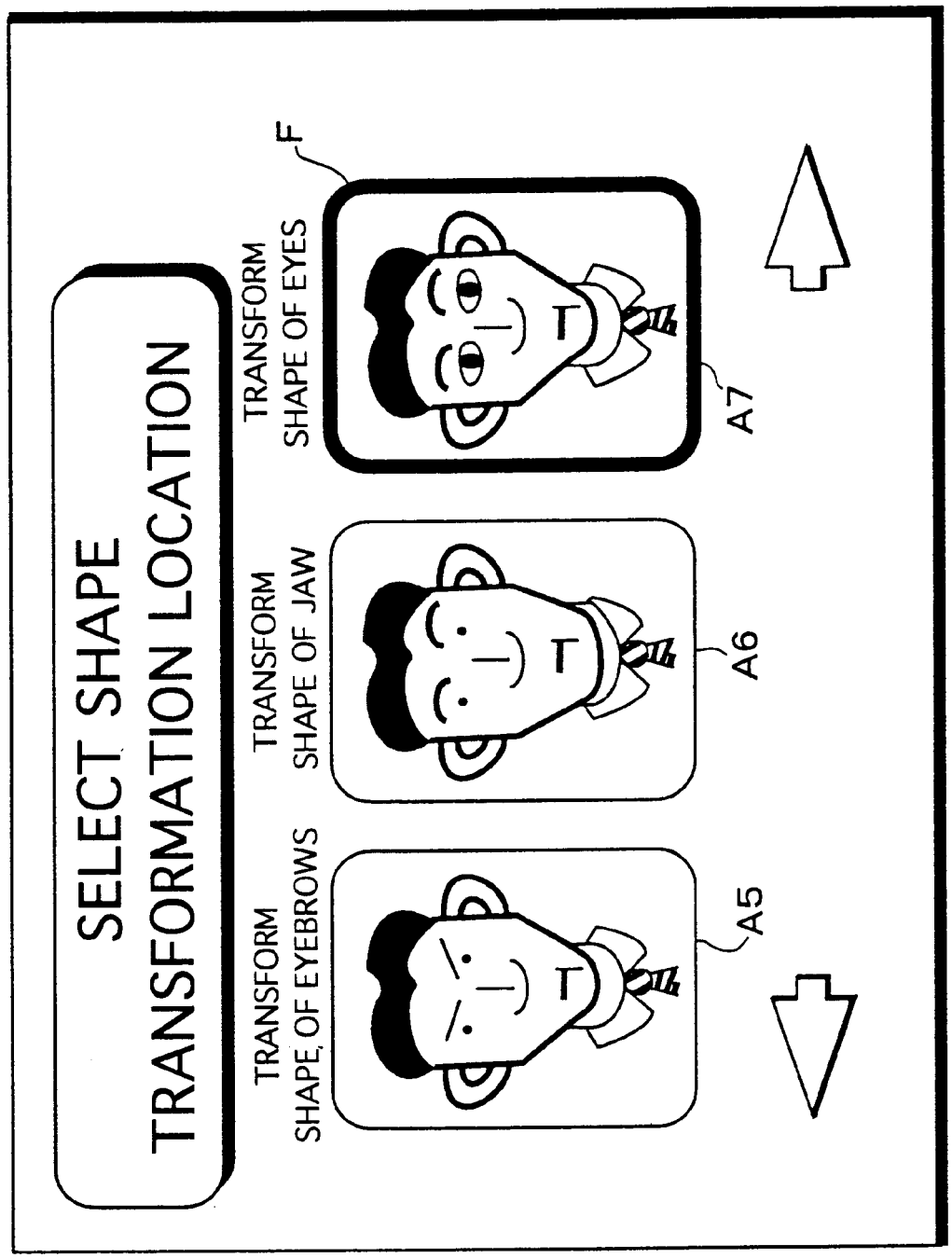

The transformation location selection area shown in FIG. 8 includes a plurality of areas A5, A6 and A7 indicating areas that are to be transformed in the captured image. Sample images indicating the transformable areas are indicated in the areas A5, A6 and A7. Area A5 indicates a sample image in which eyebrows are transformed in shape, area A6 a sample image in which the jaw is transformed in shape, an area A7 a sample image in which the eyes are transformed in shaped.

The area A5 is an area selected by the user when the image of the eyebrows in the captured image is to be transformed in shape, the area A6 is an area selected by the user when the image of the jaw in the captured image is to be transformed in shape, and area A7 is an area selected by the user when the image of the eyes in the captured image is to be transformed in shape. By pressing the left button 5 or right button 6, an area other than the areas of the images indicating the transformable locations being displayed on the transformation location selection screen appears on the screen.

A frame F is moved to leftward by pressing the left button 5 and rightward by pressing the right button 6. By pressing the OK button 7, the user causes a shape transformation to be applied to the portion of the image in the transformation location indicated in the captured image by the area enclosed by the frame F (step 64 in FIG. 5). Of course, an arrangement may be adopted in which a plurality of transformation locations can be selected.

Figure 9:
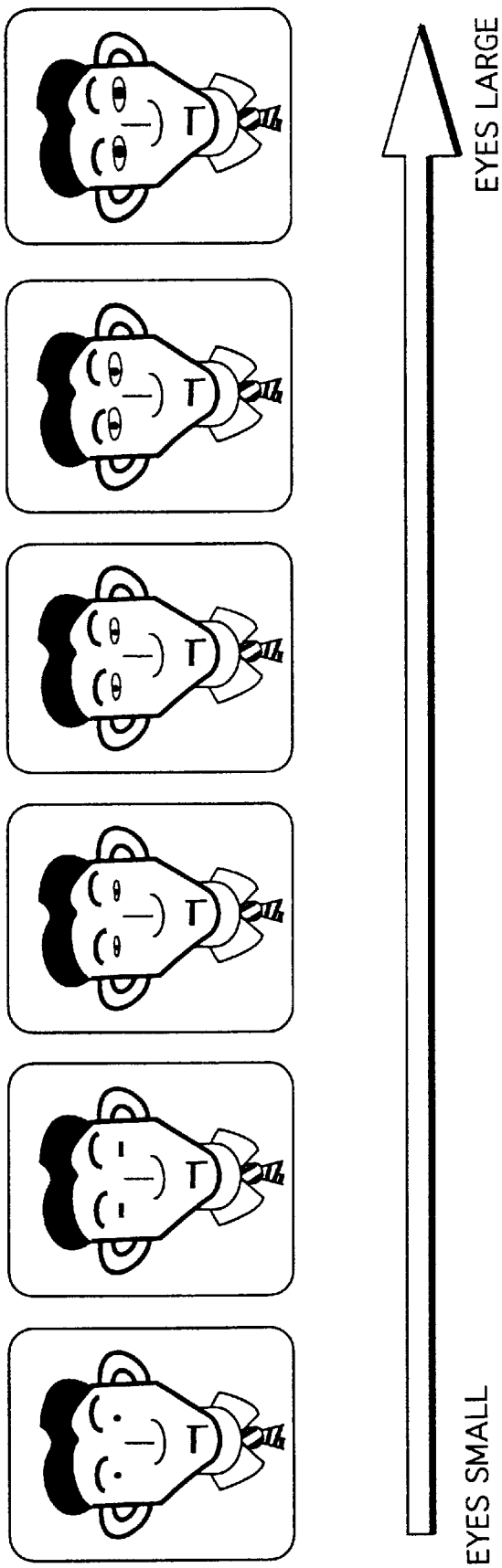
FIG. 9 shows the manner in which images are transformed in shape.
Figure 10:
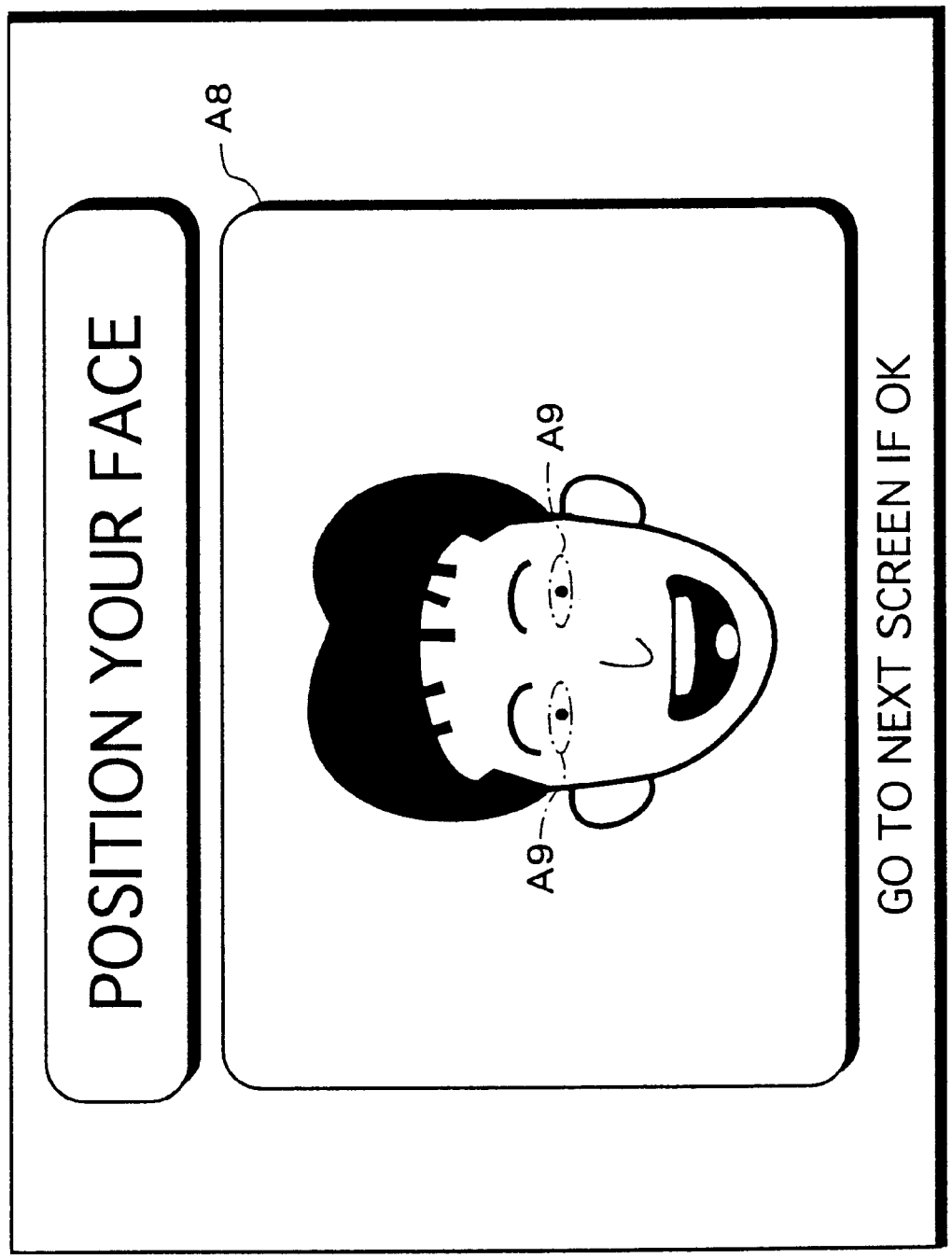
FIGS. 10 through 12 show examples of display screens.
Figure 11:
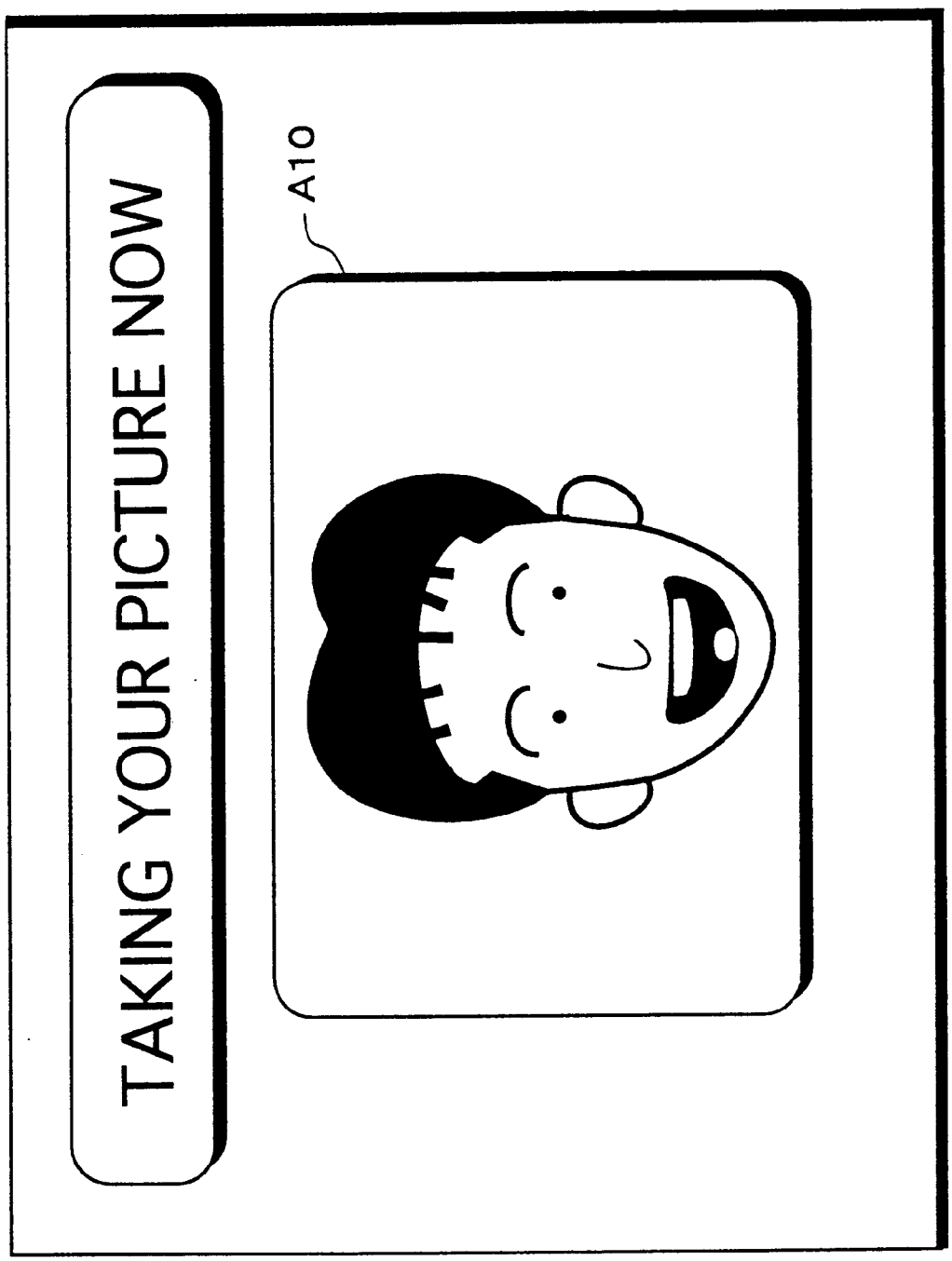

When the OK button 7 is pressed, how a selected transformation location will be transformed in shape is displayed by advancing frames successively in the manner of a slide show using sample images (see FIG. 9; step 65 in FIG. 5). If the OK button 7 is pressed by the user ("YES" at step 66 in FIG. 5), a positioning screen is displayed, as shown in FIG. 10, on the display screen of the monitor display device 3 (step 46). Here it is assumed that "EYES" has been selected as the transformation location, as illustrated in area A7 in FIG. 8.

The positioning screen includes a shot display area A8, in which the image of the user shot by the video camera 2 is displayed. A transformation location A9 also is displayed in the shot display area A8. The transformation location A9 is set so as to display the eye portions of the user displayed in the shot display area A8. A frame is formed in the transformation location A9 in such a manner that the user can ascertain the transformation location.

An arrangement may be adopted in which this position can be moved by the user. Further, an arrangement may be adopted in which the size of the transformation location A9 can be increased or decreased. This makes it possible to accommodate faces that differ from one individual to another.

If a transformation location (the eyes of the user in this example) of the image representing the user is positioned in the transformation location A9 of the shot display area A8, the OK button 7 is pressed by the user. When this is done, the display screen of the monitor display device 3 is changed over to a picture-taking screen illustrated in FIG. 11. The picture-taking area includes a photographic display area A10, which displays the image of the user. Upon elapse of a fixed period of time, digital image data obtained based upon the video signal output from the video camera 2 is loaded into the computer 20 as image data of the image of the subject representing the user image (step 47).

Of the digital image data loaded into the computer 20, the image data concerning the selected transformation location is subjected to image shape transformation processing while the degree of transformation is changed (step 48).

Figure 12:
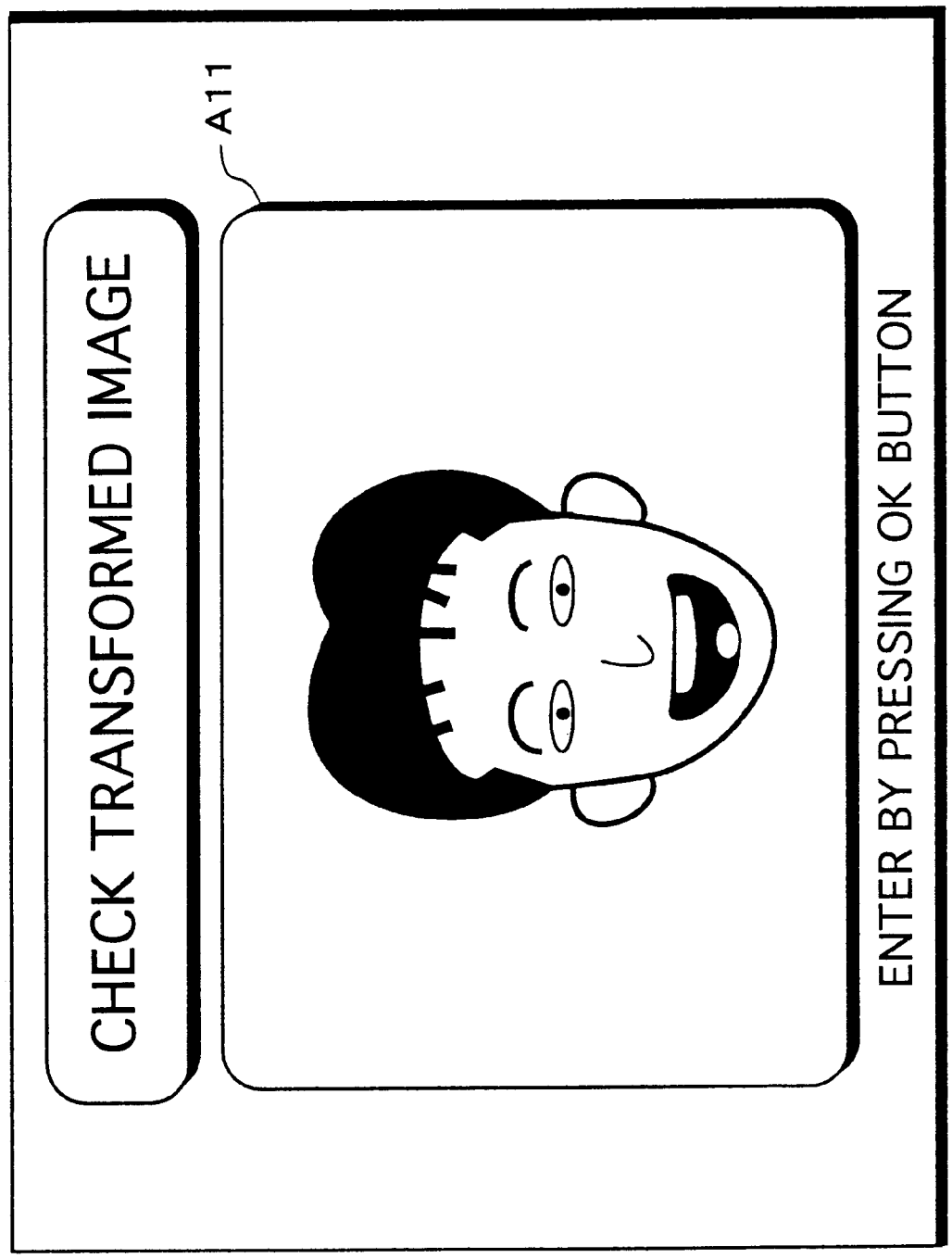
Figure 13:
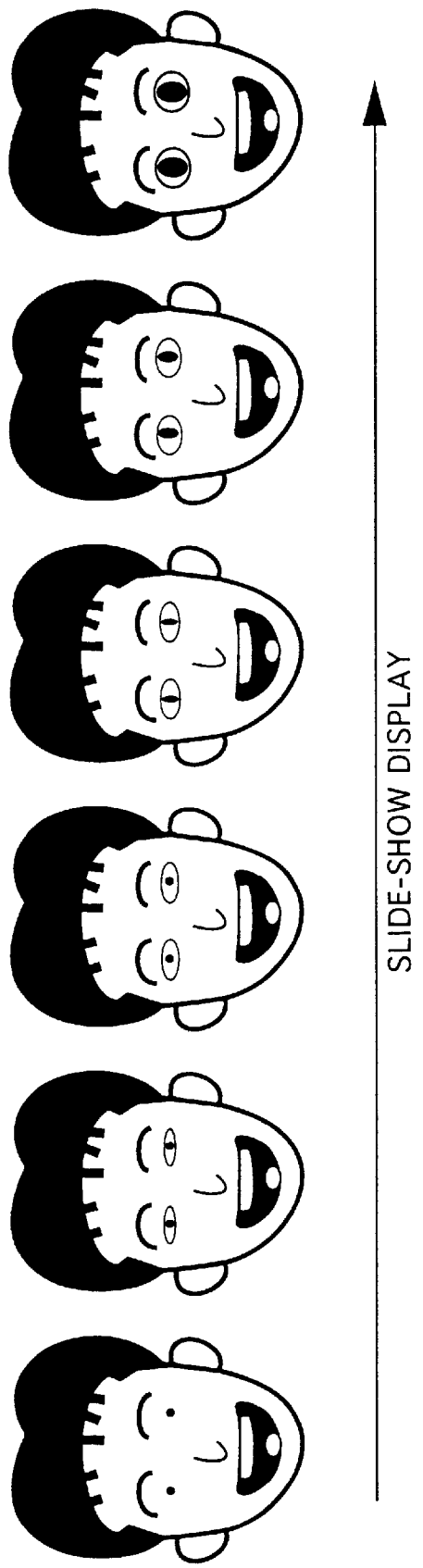
FIG. 13 shows the manner in which images are displayed by slide-show advancing of image frames.

Thereafter, a transformation verification screen, which includes a transformation-verifying image display area All, is displayed on the monitor display device 3, as shown in FIG. 12. By applying the digital image data representing the transformed image of the user to the monitor display device 3 via the capture circuit 21, images of a plurality of frames (transformed images of the user obtained by photography) having different degrees of shape transformation are displayed in the transformation-verifying image display area All by advancing the frames in the manner of a slide show (see FIG. 13; step 81 in FIG. 6). During shape transformation processing (enlargement by pixel interpolation, reduction by pixel downsampling, etc.), the screen may be changed over so as to notify the user of the fact that shape transformation processing is in progress.

If the user presses the OK button 7 ("YES" at step 82 in FIG. 6), the transformed image one frame prior to the transformed image that was being displayed in the transformation-verifying image display area A11 when the OK button 7 was pressed is entered as the image selected by the user (step 49; step 83 in FIG. 6). Since transformed images are being displayed as a slide show, the image desired by the user is entered as the image selected by the user even in a case where the user presses the OK button 7 late. It goes without saying that the transformed image that was being displayed in the transformation-verifying image display area A11 when the OK button 7 was pressed may be adopted as the image decided upon by the user. If the OK button 7 is pressed (step 84 in FIG. 6), the transformed image to be printed is entered (step 85 in FIG. 6).

If the transformed image is entered, a picture-frame selection screen for selecting a picture frame to decorate this transformed image is displayed. The user decides the frame while observing the picture-frame selection screen being displayed on the monitor display device 3 (step 50).

Figure 14:
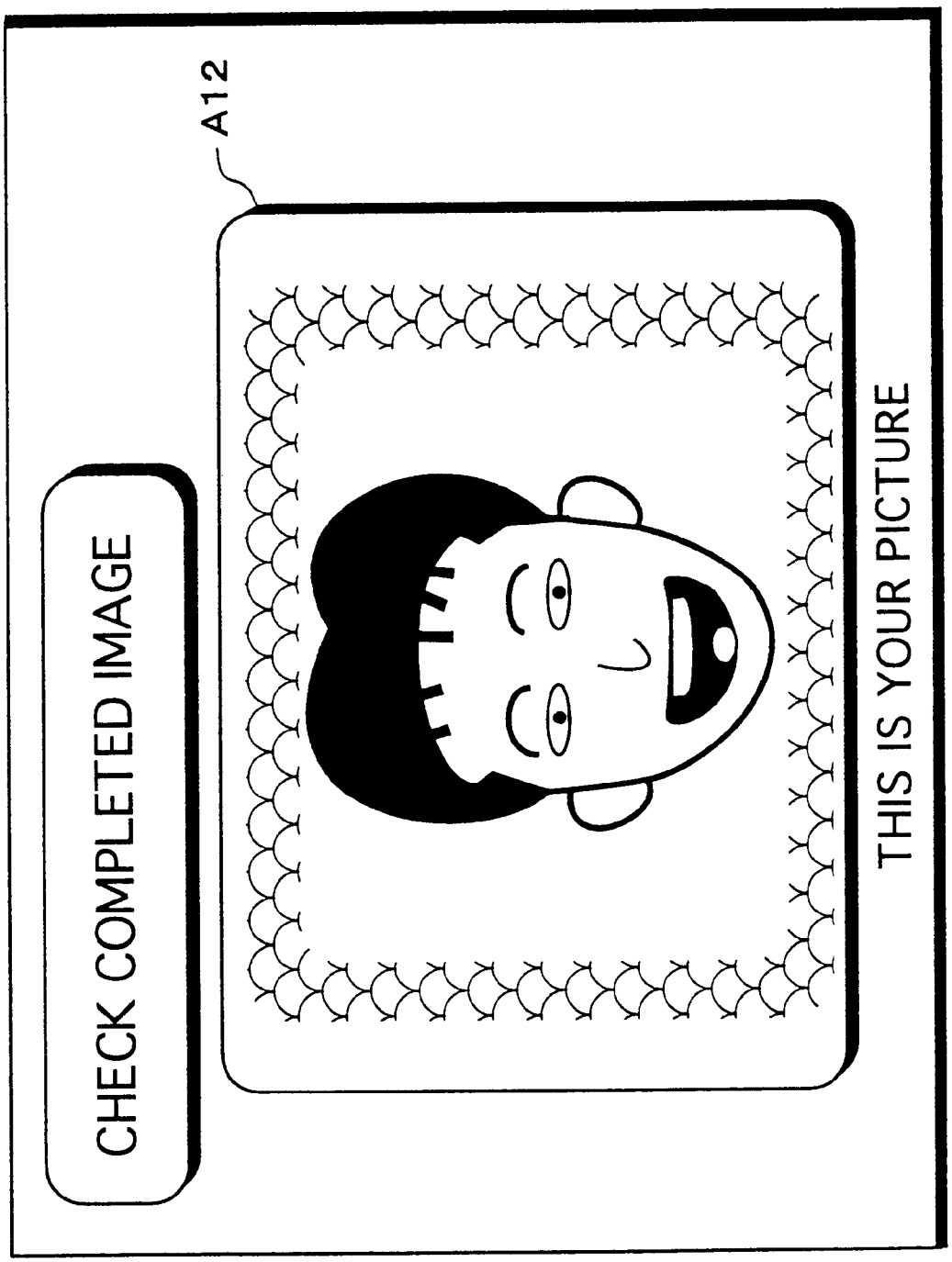
FIG. 14 shows an example of a display screen.

If the picture frame is decided, a completion-verification screen shown in FIG. 14 is displayed on the monitor display device 3. The image to be printed is displayed in the area A12 (step 51). As a result, the transformed image that will actually be printed can be verified by the user prior to printing.

If the user verifies the transformed image to be printed and then presses the OK button 7, the image thus verified by the user is printed by the printer 22 (step 52). In a case where a print-again verification screen appears on the monitor display device 3 and one more print is to be produced, the OK button 7 is pressed ("YES" at step 53). If one more print is not to be produced, then the cancel button 8 is pressed.

An exit screen is then displayed on the monitor display device 3 (step 54) and control returns to the processing of step 42. A screen-saver screen may be displayed on the monitor display device 3 until coins are dropped into the image capture apparatus 1. It goes without saying that if the power supply is turned off, the image capture apparatus 1 shuts down.

Before a transformed image is actually printed, the manner in which the image in the transformation location was transformed (FIG. 9) and the manner in which the image will be printed (FIG. 14) can be confirmed.

The images in FIG. 9 which inform the user of the manner in which the image in the transformation location was transformed may use an image of the user obtained by photography employing the video camera 2, or images represented by image data stored beforehand in the memory of the computer 20 may be used. In the case where the image of the photographed user is employed to notify the user of the manner in which the shape of the image is transformed, a rapid display is required. Accordingly, use would be made of an image resulting from downsampling of the image of the user obtained by photography.

It is also possible to adopt an arrangement in which image shape transformation processing is executed by creating beforehand an image-processing description file that describes the shape transformation processing of image data, storing the file in the memory incorporated in the computer 20 and then executing the image shape transformation processing by referring to this image-processing description file.

Figure 15:
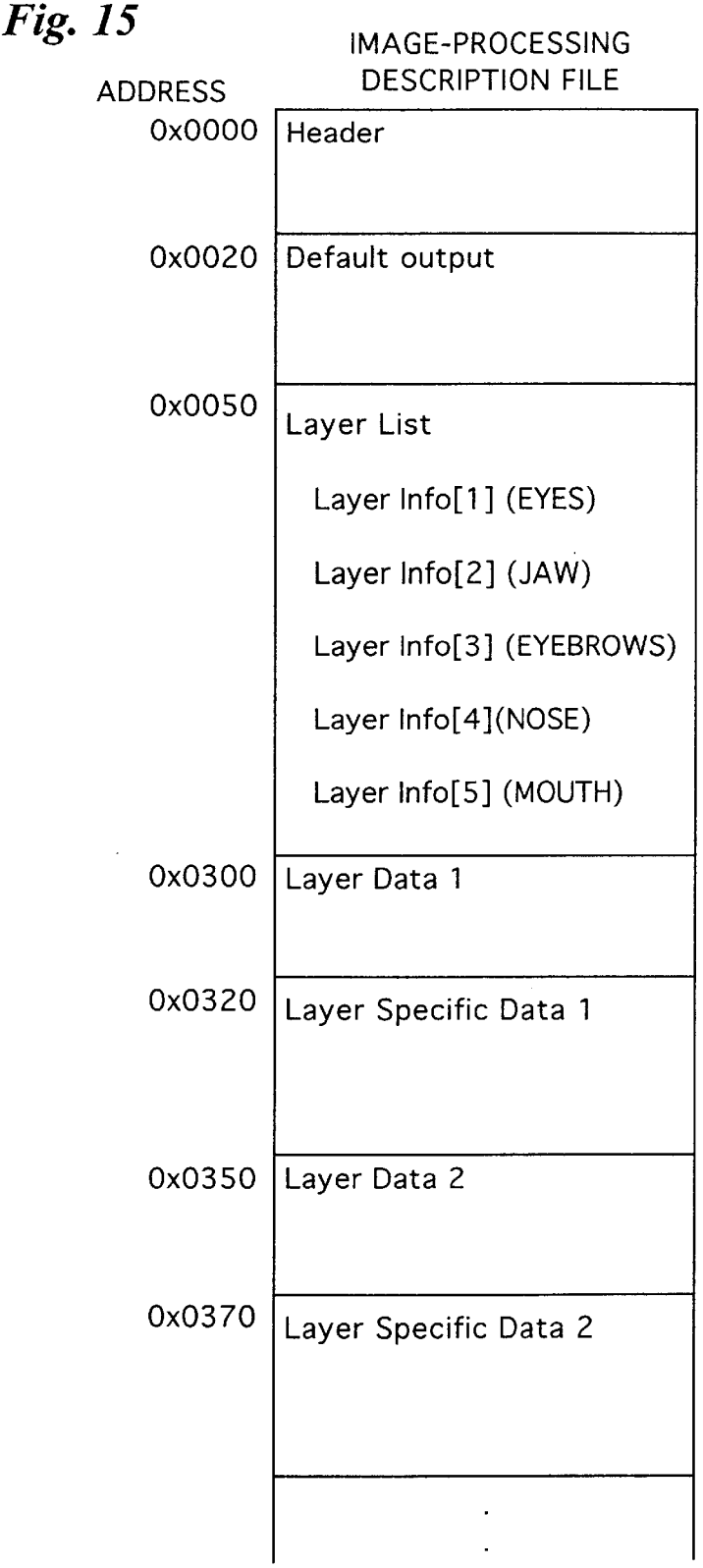
FIG. 15 illustrates an image-processing description file.

FIG. 15 illustrates the file structure of an image-processing description file.

The image-processing description file includes a header, a default output, a layer list, layer data, layer-specific data, etc.

FIG. 16 illustrates the details of the header. The header stores header information such as management information and data representing the version number of the image-processing description file.

FIG. 17 illustrates the details of the default output. Stored in default output are data representing the size (width and height) of an image when an image whose shape has been transformed is printed out, data on the output type representing the printing paper, data representing whether the output orientation is portrait or landscape, and data representing the background color of the transformed image to be printed.

FIG. 18 illustrates the details of the layer list. Layer list stores layer information (layer info) and data representing the number of items of layer information (layer count). (In the example shown in FIG. 15, five types of layer information have been stored.)

Stored in the layer information are a pointer to the layer data; layer names (in this case, shape transformation layers for image shape transformation processing, wherein layer names of shape transformations 1 to 5 indicative of different transformation locations have been stored, shape transformation layer 1 transforming the "EYES" portion, shape transformation layer 2 transforming the "JAW" portion, shape transformation layer 3 transforming the "EYE-BROWS" portion, shape transformation layer 4 transforming the "NOSE" portion and shape transformation layer 5 transforming the "MOUTH" portion); display sequence (the order of priority of displays in a case where a plurality of transformed images are displayed in superimposed form); an interchange enable/disable flag (a plurality of sample images have been stored in advance, with a flag indicating whether interchange with a stored sample image is possible or not); and interchange number.

FIG. 19 illustrates the details of layer data and layer-specific data. Two items of layer data and two items of layer-specific data are shown in FIG. 19. However, it goes without saying that five items of layer data and five items of layer-specific data have been stored in the image-processing description file.

The layer data includes a pointer to layer-specific information; a transparency mask pointer (a pointer to transparency mask data, which represents the degree to which the color of a superimposed transformed image shows through, when a plurality of transformed images are displayed in superimposed form); and a position-information pointer representing position information of a transformed image.

Stored in the layer-specific data are layer category (which here indicates the transformation layer); the format of the captured image; a pointer to the captured image; and data representing the maximum and minimum values of a layer parameter. Here the layer parameter represents the degree of shape transformation. The maximum and minimum values of the layer parameter can be changed. Changing the maximum and minimum values of the layer parameter makes it possible to change the degree of shape transformation.

When such an image-processing description file has been stored in the memory of the computer, a captured image is subjected to shape transformation processing in the manner described below (the processing of step 48 in FIG. 4).

FIG. 20 is a flowchart illustrating the procedure of processing for transforming the shape of an image.

Processing for selecting a shape transformation layer is executed before image shape transformation processing (step 70). As mentioned earlier, an image shape transformation location is selected using the screen shown in FIG. 8 for selecting the image transformation location. The transformation layer that corresponds to the selected image transformation location is selected (step 70). In a case where "EYES" has been selected as the transformation location by the user, transformation layer 1 is selected (step 71). In a case where "JAW" has been selected as the transformation location by the user, transformation layer 2 is selected (step 72). In a case where "EYEBROWS" has been selected as the transformation location by the user, transformation layer 3 is selected (step 73). In a case where "NOSE" has been selected as the transformation location by the user, transformation layer 4 is selected (step 74). In a case where "MOUTH" has been selected as the transformation location by the user, transformation layer 5 is selected (step 75).

In any case, when the shape transformation layer is selected, a sample image stored beforehand and the captured user image are interchanged. In regard to the captured image, a location specified by the selected transformation layer undergoes a shape transformation at the degree of shape transformation decided by the layer parameter (step 76). The image transformed in shape is displayed on the display screen of the monitor display device 3 in the manner set forth above (see FIG. 13).

The degree of shape transformation may be changed for every transformation layer. For example, transformation layer 1 is set in such a manner that shape transformation is performed to the maximum degree, transformation layer 2 is set in such a manner that shape transformation is performed to the next highest degree, transformation layer 3 is set in such a manner that shape transformation is performed to a standard degree, transformation layer 4 is set in such a manner that shape transformation is performed to a small degree, and transformation layer 5 is set in such a manner that shape transformation is performed to the minimum degree. The degree of shape transformation can be selected by selecting the transformation layer. In a case where the degree of shape transformation is changed for every transformation layer, it would be necessary to generate an image-processing description file corresponding to the degree of shape transformation and store the file in the memory of the computer 20.

Figure 21:
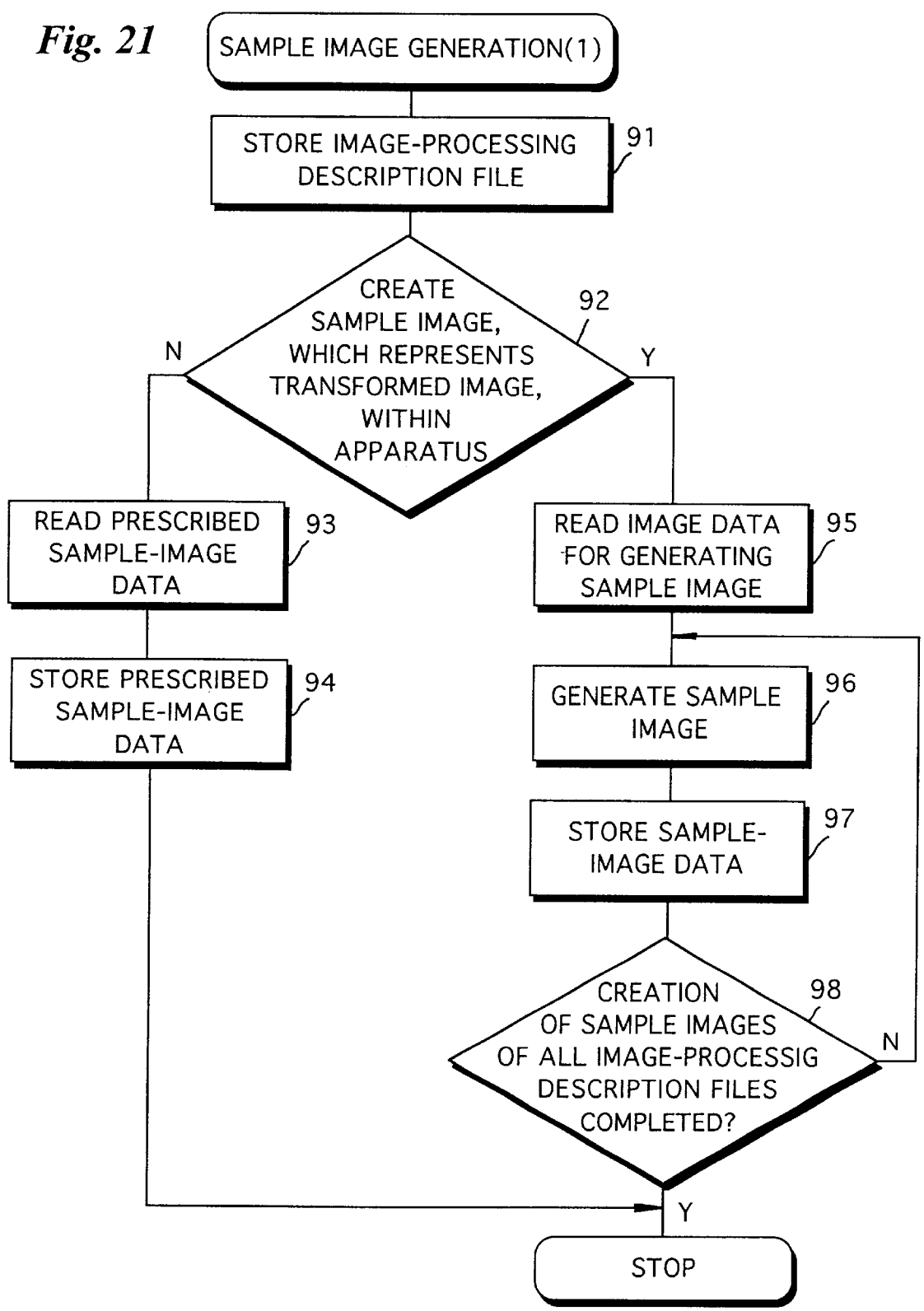
FIGS. 21 and 22 are flowcharts illustrating processing for generating a sample image.
Figure 22:
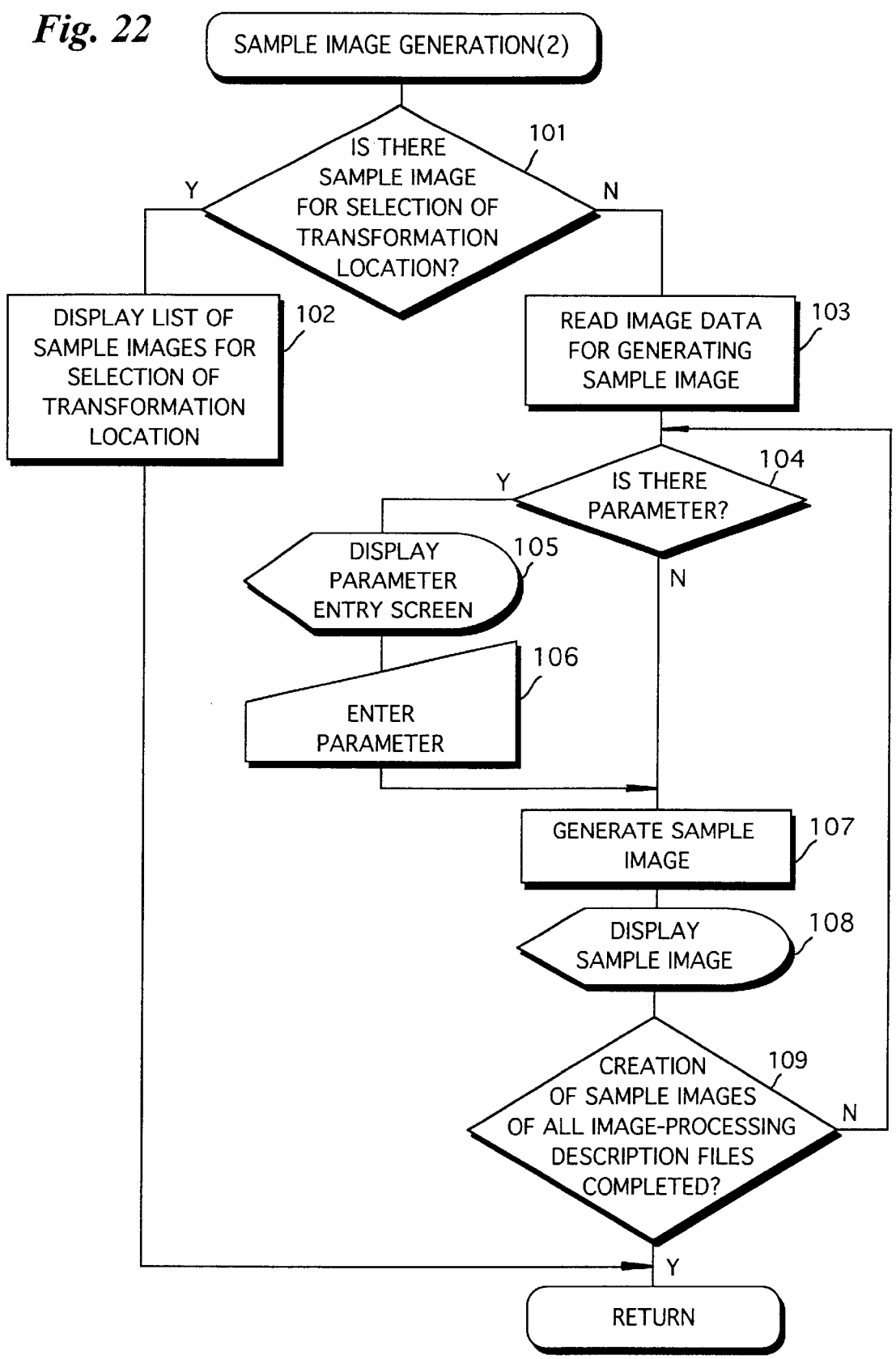

FIGS. 21 and 22 are flowcharts illustrating processing at such time that image data representing a sample image displayed on the display screen of the monitor display device 3 is generated when the user is allowed to select the transformation location.

FIG. 21 is a flowchart of processing for generating image age data representing a sample image when the image data representing the sample image is stored in the image capture apparatus 1.

The image-processing description file is stored in the memory of the computer 20 (step 91). It is then determined whether the sample image is to be created by the image capture apparatus 1 itself (step 92).

If the sample image is to be created by the image capture apparatus 1 itself ("YES" at step 92), then the image data for creating a sample image is read by, e.g., a scanner (step 95). A sample image is generated using the image data that has been read (step 96). Data representing the generated sample image is stored in the memory of the computer 20 (step 97). The processing of steps 96 and 97 is repeated until completion of the creation of sample images regarding all stored image-processing description files, i.e., sample images representing all locations capable for being transformed in shape (step 98). The sample images may be images that differ from one another for each transformation location. In a case where a sample image is created by the image capture apparatus 1 per se, a sample image that differs for each image capture apparatus 1 can be displayed.

In a case where a sample image is not created by the image capture apparatus 1 ("NO" at step 92), image data of a prescribed sample image is read (step 93) (this would be entered via the I/O unit 25) and the read sample-image data is stored in the internal memory of the computer 20 (step 94).

FIG. 22 is a flowchart showing a processing procedure for storing image data representing a sample image in the image capture apparatus 1 when a sample image is selected.

When a shape transformation location is selected, as shown in FIG. 8, it is determined whether image data representing a sample image has already been stored in the memory of the computer 20 (step 101). If image data representing a sample image has not been stored in the internal memory of the image capture apparatus 1 ("NO" at step 101), image data for sample-image generation is read in the image capture apparatus (step 103). Next, it is determined whether there is a parameter for setting the degree of transformation of a transformation location (step 104).

If there is a parameter, a display screen prompting entry of the parameter is displayed on the display screen of the monitor display device 3 (step 105). The parameter is then entered by, e.g., a maintenance man (step 106). A sample image having a degree of transformation in accordance with the entered parameter is generated (step 107). When there is no input parameter ("NO" at step 104), a sample image is generated at a prescribed degree of transformation (step 107). The generated sample image is displayed on the display screen of the monitor display device 3 (step 108). The processing of steps 104 to 108 is repeated until sample images regarding all image-processing description files have been generated (step 109). In a case where sample-image data representing a transformation location is generated when a transformation location is selected, low-quality image data would be used for the sample images in order to present a rapid display.

Further, when a composite image is printed, high-quality image data is used so that a high-quality print image can be obtained. When the image data is displayed on the display screen of the monitor display device 3, the image data may be downsampled and use made of image data containing less data in order to present a more rapid display.

If image data representing sample images have been stored in the internal memory of the image capture apparatus 1 ("YES at step 101), the image data are read from the internal memory. Sample images representing read image data are displayed on the display screen of the monitor display device 3 (step 102).

(2) Second Embodiment

Figure 23:
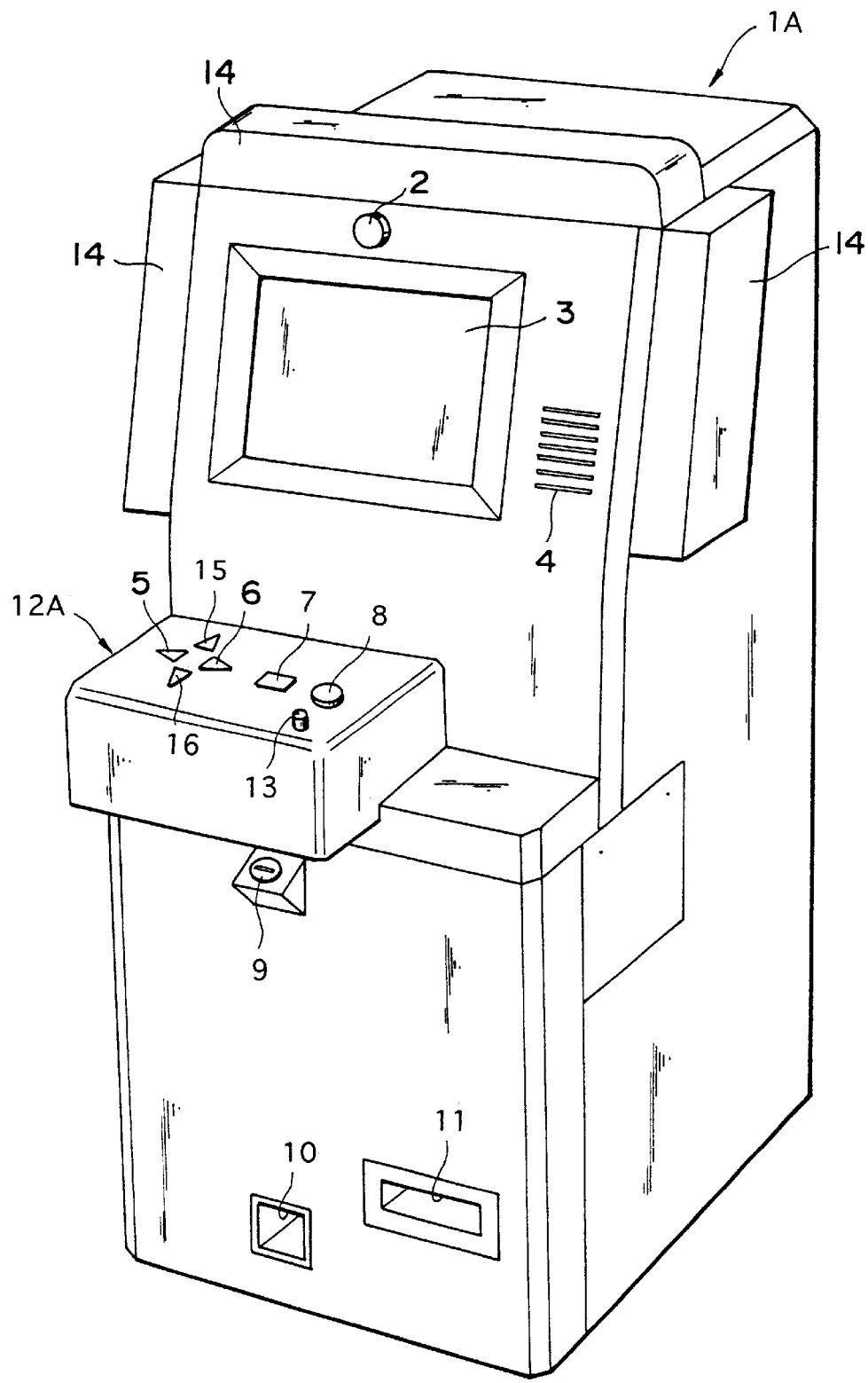
FIG. 23 is a perspective view of an image capture apparatus according to another embodiment.

FIG. 23 is a perspective view showing an image capture apparatus 1A according to a second embodiment of the present invention. Components in FIG. 23 identical with those shown in FIG. 1 are designated by like reference characters and need not be described again.

The image capture apparatus 1A shown in FIG. 23 differs from the image capture apparatus 1 of FIG. 1 in that the control panel 12A is provided with an up button 15 and a down button 16.

Figure 24:
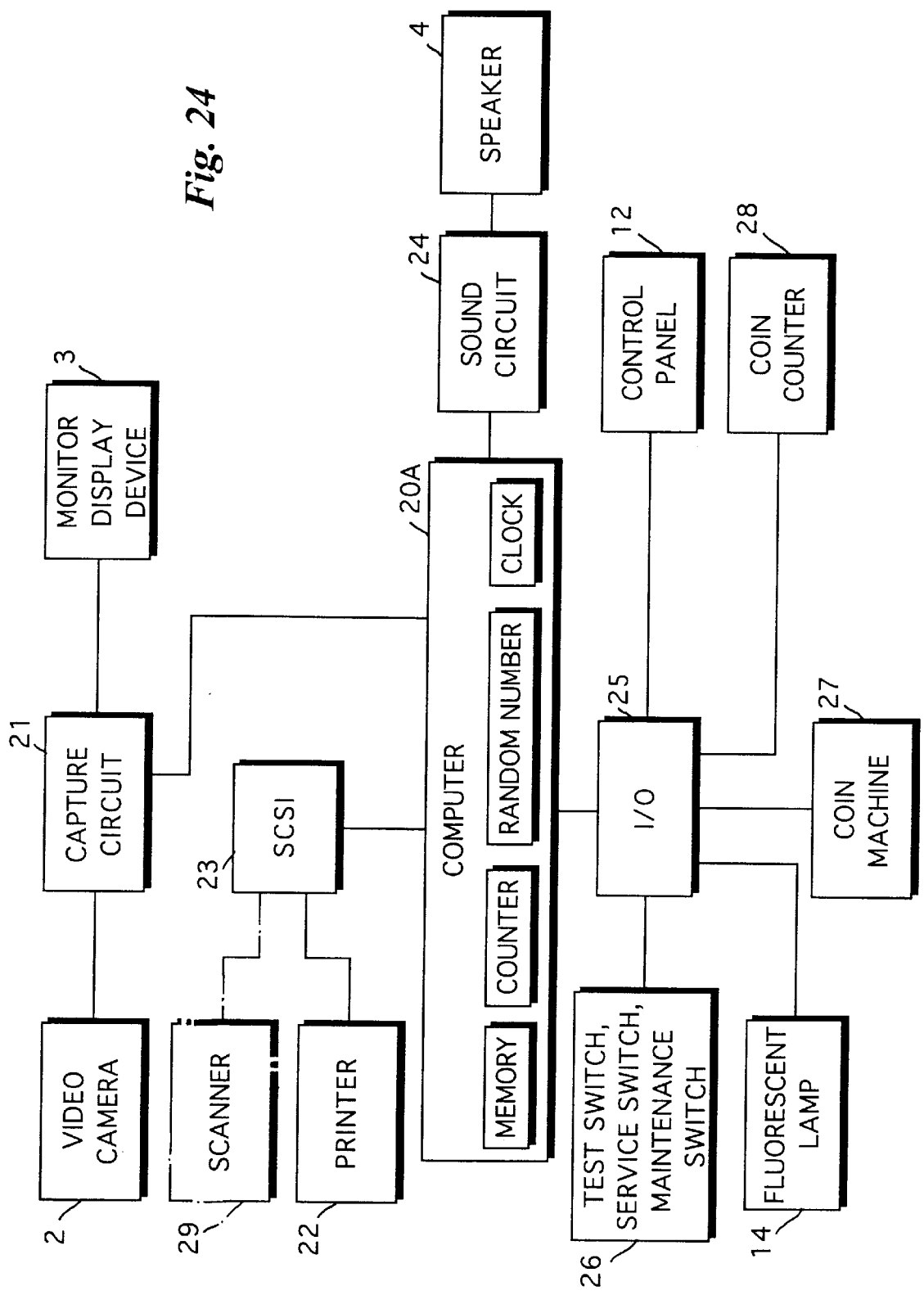
FIG. 24 is a block diagram showing the electrical construction of the image capture apparatus according to this embodiment.

FIG. 24 is a block diagram showing part of the electrical construction of the image capture apparatus 1A. Circuits and other components in FIG. 24 identical with those shown in FIG. 2 are designated by like reference characters and need not be described again.

The overall operation of the image capture apparatus 1A is supervised by a computer 20A. The latter includes a memory for storing operation programs, data representing a shape transformation location and other necessary data. The computer 20A further includes a counter, a random-number generator and a clock.

Figure 25:
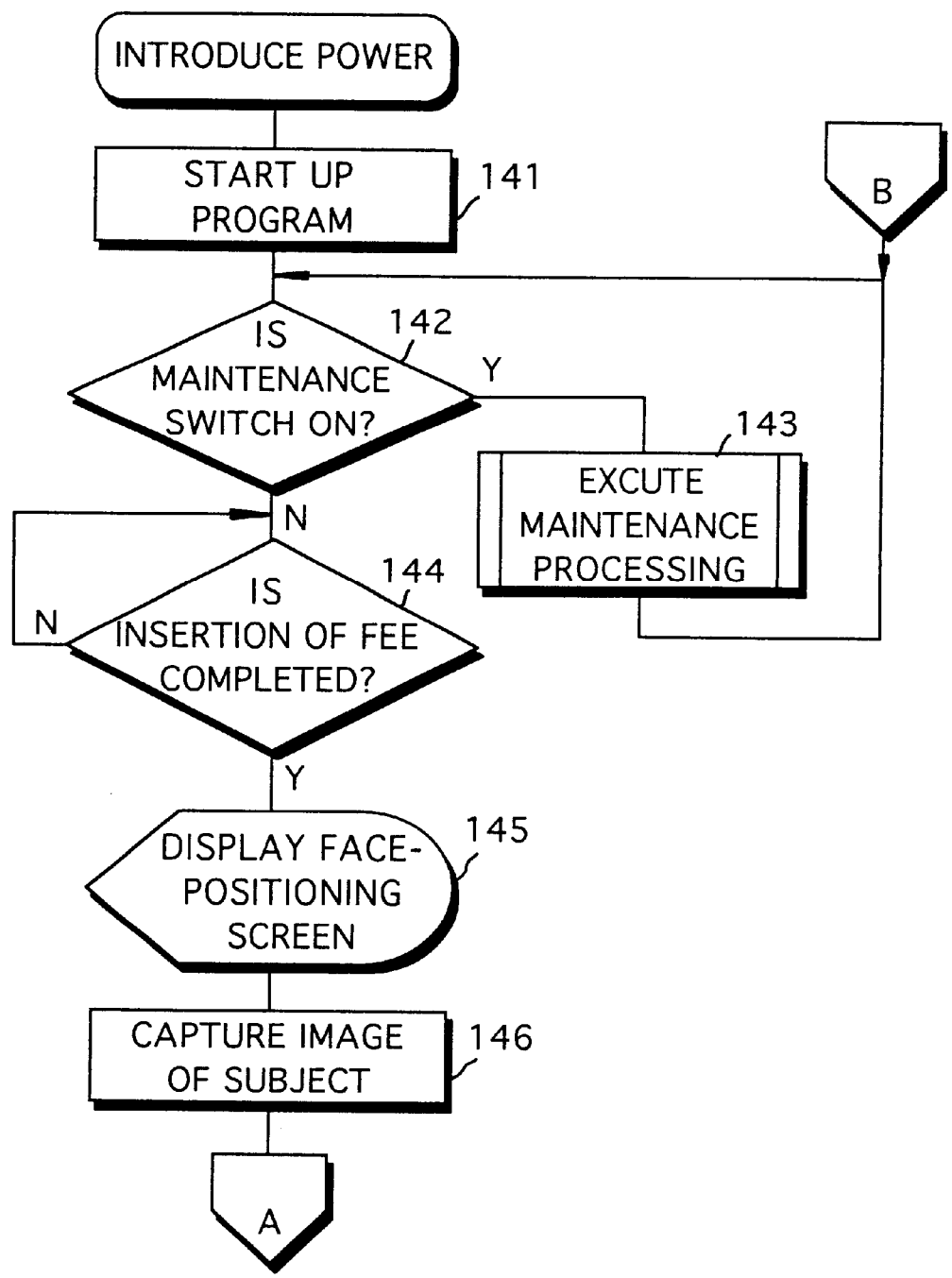
FIGS. 25 and 26 are flowcharts illustrating the procedure of processing executed by the image capture apparatus according to this embodiment.
Figure 26:
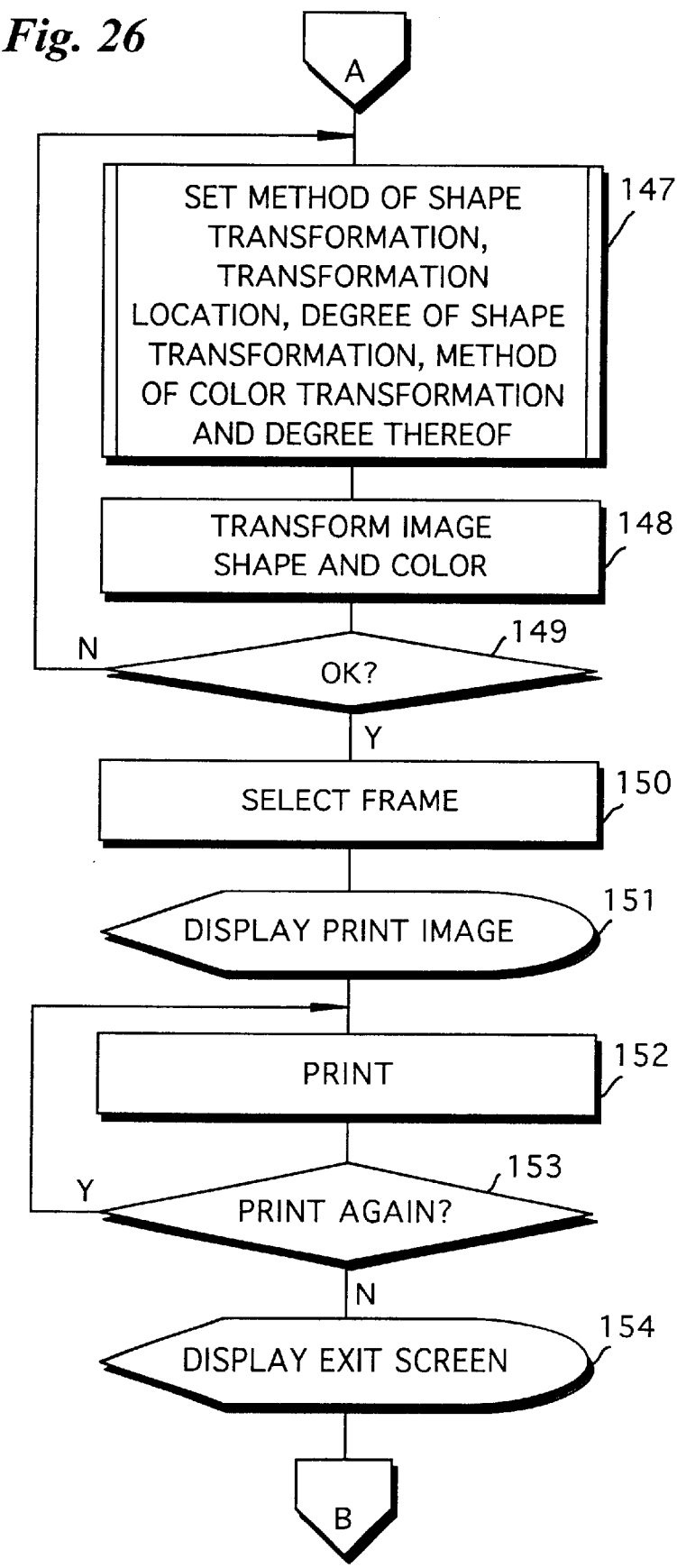
Figure 27:
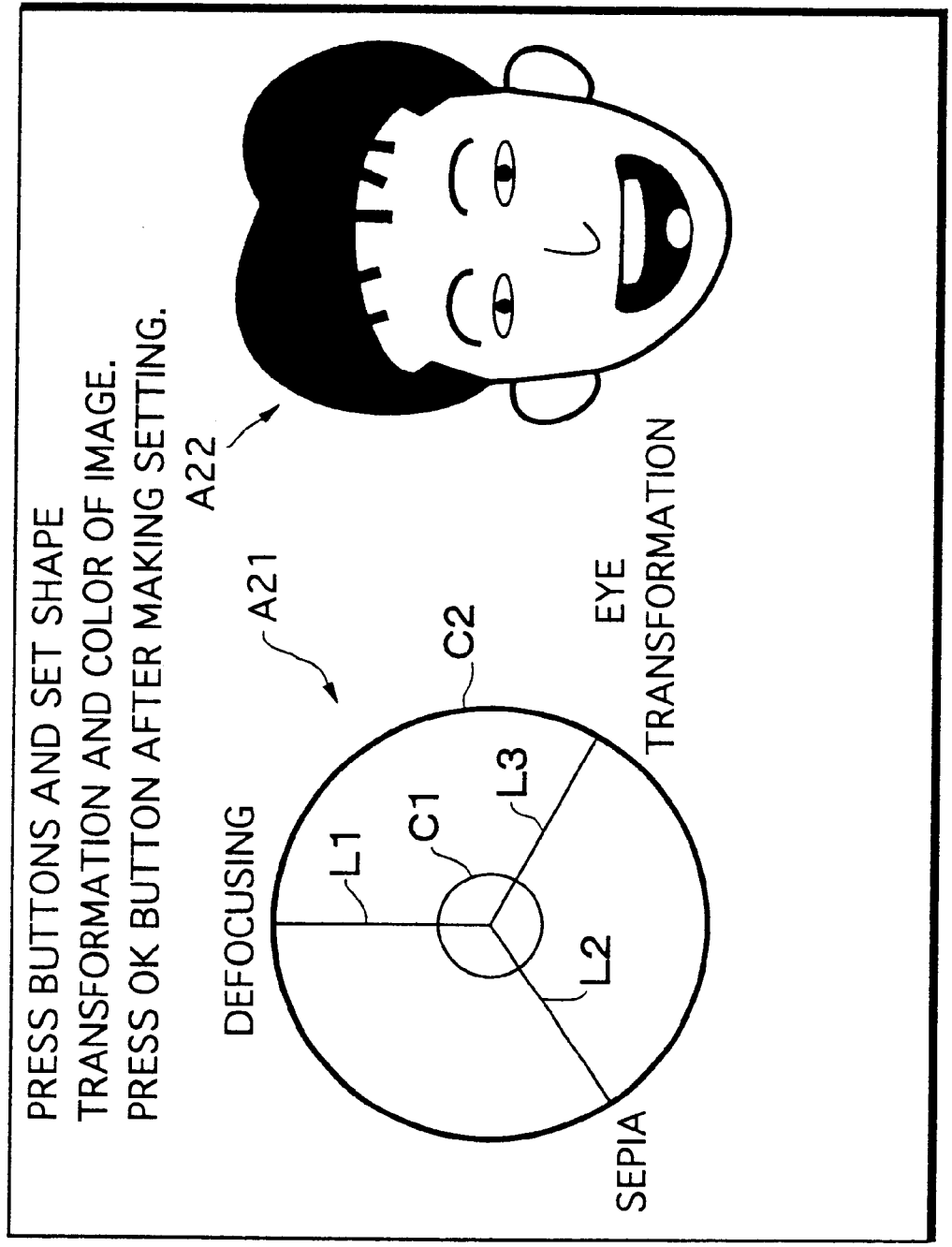
FIG. 27 shows an example of a screen displayed on the image capture apparatus according to this embodiment.

FIGS. 25 and 26 are flowcharts illustrating the procedure of processing executed by the image capture apparatus 1A, FIG. 27 shows an example of a screen displayed on the monitor display device 3 of image capture apparatus 1A.

Figure 28:
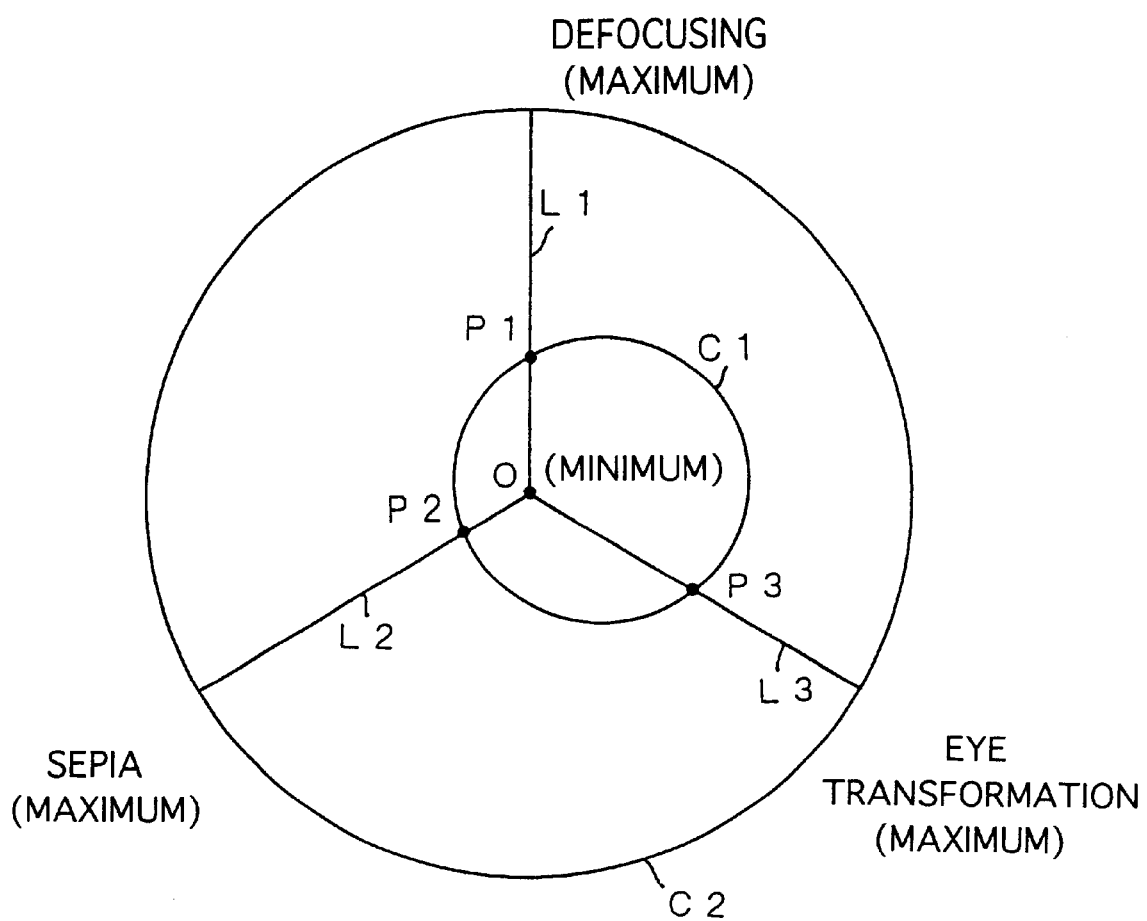
FIG. 28 illustrates a chart for setting image shape transformation and image color transformation.
Figure 29:
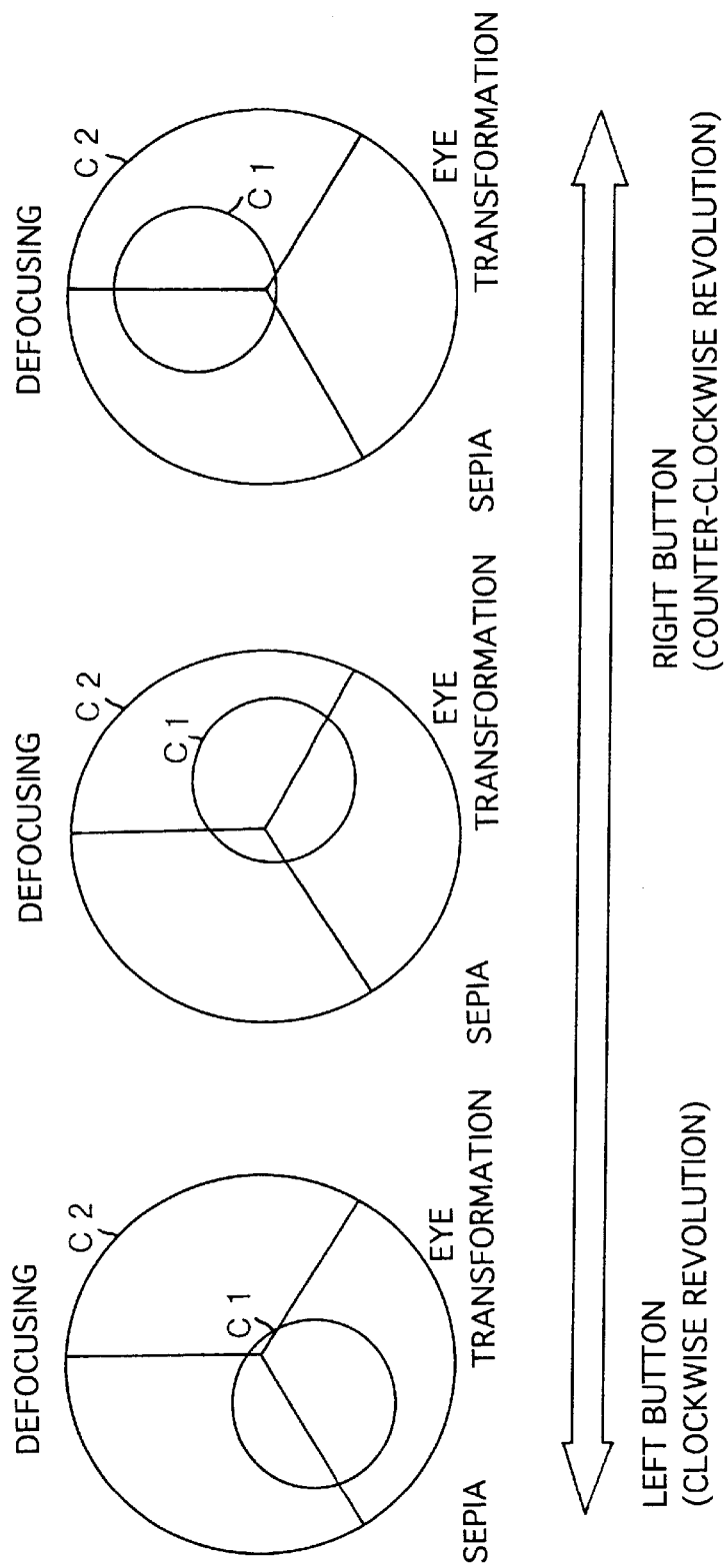
FIGS. 29 and 30 illustrate the manner in which image shape transformation and color transformation are set using the setting chart.
Figure 30:
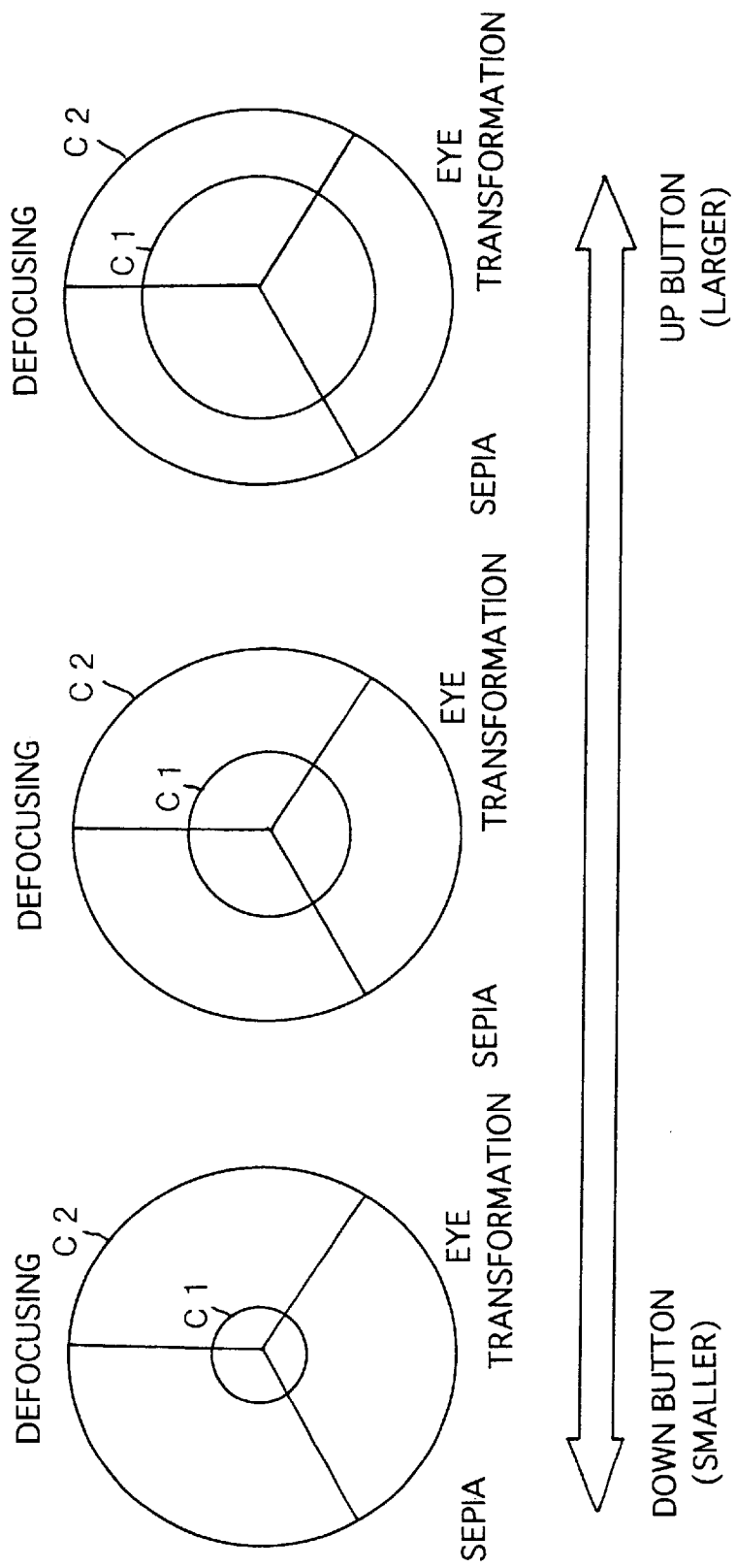

FIG. 28 illustrates a setting chart used when setting an image shape transformation method, transformation location, degree of shape transformation, color transformation method and degree of color transformation, FIG. 29 illustrates the manner in which an image shape transformation method and color transformation method are set using the setting chart, and FIG. 30 shows the manner in which degree of image shape transformation and degree of image color transformation are set using the setting chart.

FIGS. 31a to 34b show setting charts and image set by these setting charts.

The processing shown in FIGS. 25 and 26 starts when power is introduced to the image capture apparatus 1A.

The program for operating the computer 20A is started up by introducing power (step 141). Monitoring is performed to determine whether the maintenance switch has been turned on (step 142). If the maintenance switch has been turned on ("YES" at step 142), the image capture apparatus 1A is subjected to maintenance processing by a maintenance man (step 143).

When the operating program of the image capture apparatus 1A is started up, a screen prompting the user to insert coins is displayed on the display screen of the monitor display device 3. The user responds by dropping coins corresponding to the user fee into the coin insertion slot 9, and the dropping of the coins is confirmed by the coin counter 28 (step 144).

When dropping of the coins corresponding to the user fee of the image capture apparatus 1A is confirmed ("YES" at step 144), a positioning screen is displayed on the display screen of the monitor display device 3 in such a manner that the user will bring his or her face to a position at which it can be photographed by the video camera 2 (step 145). While observing the positioning screen, the user moves in such a manner that his or her own face will be photographed by the video camera 2.

When the user has moved so as to be photographed by the video camera 2, the OK button 7 is pressed by the user. Then, upon elapse of a fixed period of time, the subject is photographed by the video camera 2 and digital image data in the video signal output from the video camera 2 is loaded into the computer 20A as image data of the subject image representing the image of the user (step 146).

When the image data representing the image of the subject is loaded into the computer 20A, method of shape transformation, transformation location, degree of shape transformation, method of color transformation and degree of color transformation are set in regard to the captured image (step 147). The details of these settings will be described later.

The digital image data that has been loaded into the computer 20A is subjected to image shape transformation and image color transformation processing based upon the shape transformation method and color transformation method that have been set (step 148).

The image that has undergone image shape transformation and image color transformation processing is displayed on the display screen of the monitor display device 3 and is conformed by the user. If the OK button 7 is pressed by the user ("YES" at step 149), then the image whose shape and color have been altered is entered.

If the image whose shape and color have been altered is entered, a picture-frame selection screen for selecting a picture frame to decorate this shape-and-color transformed image is displayed. The user decides the frame while observing the picture-frame selection screen being displayed on the monitor display device 3 (step 150).

If the picture frame is decided, a completion-verification screen is displayed on the monitor display device 3 (step 151). As a result, the transformed image that will actually be printed can be verified by the user prior to printing.

If the user verifies the transformed image to be printed and then presses the OK button 7, the image thus verified by the user is printed by the printer 22 (step 152). In a case where a print-again verification screen appears on the monitor display device 3 and one more print is to be produced, the OK button 7 is pressed. If one more print is not to be produced, then the cancel button 8 is pressed (step 153).

An exit screen is then displayed on the monitor display device 3 (step 154) and control returns to the processing of step 142. A screen-saver screen may be displayed on the monitor display device 3 until coins are dropped into the image capture apparatus 1A. It goes without saying that if the power supply is turned off, the image capture apparatus 1A shuts down.

Described next will be a procedure for setting the shape transformation method, transformation location, shape transformation degree, color transformation method and color transformation degree of an image that has been captured by the computer 20A.

When an image shape transformation method or the like is set, a setting screen of the kind shown in FIG. 27 is displayed on the monitor display device 3.

The setting screen has an area A21 in which the setting chart is displayed and an area A22 in which the captured image is displayed. An image that has been subjected to shape transformation processing and an image that has been subjected to color transformation processing also are displayed in the area A22.

As shown in FIG. 28, the setting chart has a large circle C2 in which a small circle C1 is displayed. The interior of the large circle C2 is partitioned into three sectors corresponding to shape transformation methods and color transformation methods that can be set (the shape and color transformation methods that can be set are of three types in this embodiment, namely "DEFOCUSING", "SEPIA" and "EYE TRANSFORMATION"). Three lines L1, L2 and L3 are displayed extending radially outward from the center "O" of the large circle C2 to the circumference of the large circle C2.

The shape transformation method and degree thereof, and the color transformation method and degree thereof, are set based upon the points of intersection between the circumference of the small circle C1 and the lines L1, L2 and L3. The degree of shape transformation and the degree of color transformation decrease as the points of intersection between the circumference of the small circle C1 and the lines L1, L2 and L3 approach the center "O" of the large circle C2, and the degree of shape transformation and the degree of color transformation increase as the points of intersection between the circumference of the small circle C1 and the lines L1, L2 and L3 approach the circumference of the large circle C2.

By way of example, since the intersection P1 between the line L1 and the small circle C1 resides at a position corresponding to two-fifths of the maximum value of defocusing, defocusing which is two-fifths of maximum defocusing is set. Since the intersection P2 between the line L2 and the small circle C1 resides at a position corresponding to one-fifth of the maximum value of sepia color transformation processing, color transformation processing is set so as to obtain sepia color transformation processing which is one-fifth of maximum sepia color transformation processing (i.e., processing to change the ratio of yellow color). Furthermore, since the intersection P3 between the line L3 and the small circle C1 resides at a position corresponding to two-fifths of the maximum value of eye transformation, eye transformation processing is executed so as to obtain eye transformation processing which is two-fifths of maximum eye transformation processing.

The small circle C1 is positioned using buttons 5, 6, 7 and 8. Pressing the left button 5 moves the center of small circle C1 leftward in the large circle C2, pressing the right button 6 moves the center of small circle C1 rightward in the large circle C2, pressing the up button 15 moves the center of small circle C1 upward in the large circle C2, and pressing the down button 16 moves the center of small circle C1 downward in the large circle C2. The position of the small circle C1 in the diametric direction of the large circle C2 is entered. When this is done, the OK button 7 is pressed by the user. When the OK button 7 is pressed, the position of the small circle C1 in the circumferential direction of the large circle C2 and the size of the small circle C1 are decided in the following manner:

Pressing the left button 5 revolves the small circle C1 clockwise about the center "O" of the large circle C2, and pressing the right button 6 revolves the small circle C1 counter-clockwise about the center "O" of the large circle C2, as shown in FIG. 29.

Furthermore, pressing the up button 15 enlarges the size of the small circle C1, and pressing the down button 16 reduces the size of the small circle C1, as shown in FIG. 30.

By thus operating the left button 5, right button 6, up button 15 and down button 16, the user can change the position and size of the small circle C1 in the setting chart and can set the shape transformation method of the captured image and the degree thereof as well as the color transformation of the captured image and the degree thereof. The setting is finalized by pressing the OK button 7.

An arrangement may be adopted in which the processing for deciding the position of the small circle C1 circumferentially of the large circle C2 and the size of the small circle C1 as well as the processing for deciding the position of the small circle C1 diametrically of the large circle C2 can be performed again by pressing the cancel key 10. For example, the processing for deciding the position of the small circle C1 circumferentially of the large circle C2 and the size of the small circle C1 would be made executable again by pressing the cancel key 10 once, and processing for deciding the position of the small circle C1 diametrically of the large circle C2 would be made executable again by pressing the cancel key 10 twice.

If the center of the small circle C1 and the center "O" of the large circle are made to coincide and the small circle C1 is set to be comparatively small, as shown in FIG. 31a, then shape transformation and color transformation processing will be executed in such a manner that defocusing shape transformation, sepia color transformation and eye shape transformation will each be performed is small increments (see FIG. 31b).

In FIG. 32a, the position and size of the small circle C1 have been set in such a manner that the amount of defocusing is large in comparison with the sepia color transformation and eye shape transformation. As a result, shape transformation processing is executed in such a manner that the captured image undergoes a greater amount of defocusing (see FIG. 32b).

In FIG. 33a, the position and size of the small circle C1 have been set in such a manner that the sepia color transformation processing is made large in comparison with the processing for defocusing and eye shape transformations. As a result, processing is executed in such a manner that the captured image undergoes a greater degree of sepia color transformation processing (see FIG. 33b). (In FIG. 33b, the manner in which the sepia color transformation is being performed is indicated by the hatching.)

In FIG. 34a, the position and size of the small circle C1 have been set in such a manner that the sepia color transformation processing and eye shape transformation processing is made large in comparison with the processing for defocusing transformation. As a result, processing is executed in such a manner that the captured image undergoes a greater degree of sepia color transformation and a greater degree of eye shape transformation (see FIG. 34b).

It goes without saying that the relationships between the large circle C2 and small circle C1 in the above-described setting chart, the processing based upon these relationships and the calculation of degree of processing are performed by the computer 20A. An arrangement can also be adopted in which, in a manner described below, image shape transformation processing and image color transformation processing is executed by previously creating an image-processing description file that describes the shape transformation processing of image data, storing the file in the memory incorporated in the computer 20A, and executing image shape transformation processing and image color transformation processing by referring to this file.

FIG. 35 illustrates the file structure of the image-processing description file.

The image-processing description file includes a header, a default output, a layer list, layer data, layer-specific data, etc.

FIG. 36 illustrates the details of the layer list. Layer list stores layer information (layer info) and data representing the number of items of layer information (layer count). (In the example shown in FIG. 36, three types of layer information have been stored.)

Stored in the layer information are a pointer to the layer data; layer names (in this case, shape transformation and color transformation layers for image shape transformation processing and image color transformation processing, wherein layer 1 is for "DEFOCUSING" processing, layer 2 for shape transformation of the "EYES" portion, and layer 3 for color transformation to the "SEPIA" color); display sequence (the order of priority of displays in a case where a plurality of shape-transformed images are displayed in superimposed form); an interchange enable/disable flag (a plurality of sample images have been stored in advance, with a flag indicating whether interchange with a stored sample image is possible or not); and interchange number.

The layer data includes a pointer to layer-specific information; a transparency mask pointer (a pointer to transparency mask data, which represents the degree to which the color of a superimposed transformed image shows through, when a plurality of transformed images are displayed in superimposed form); and a position-information pointer representing position information of a transformed image.

Stored in the layer-specific data are layer category (here layer 1 and layer 2 indicate shape transformation layers, and layer 3 indicates a color transformation layer); the format of the captured image; a pointer to the captured image; and data representing the maximum and minimum values of a layer parameter. Here the layer parameter represents the degree of shape transformation or the degree of color transformation. The maximum and minimum values of the layer parameter can be changed. Changing the maximum and minimum values of the layer parameter makes it possible to change the degree of shape transformation or the degree of color transformation.

When such an image-processing description file has been stored in the memory of the computer 20A, a captured image is subjected to shape transformation processing in the manner described below (the processing of step 148 in FIG. 26).

Figure 37:
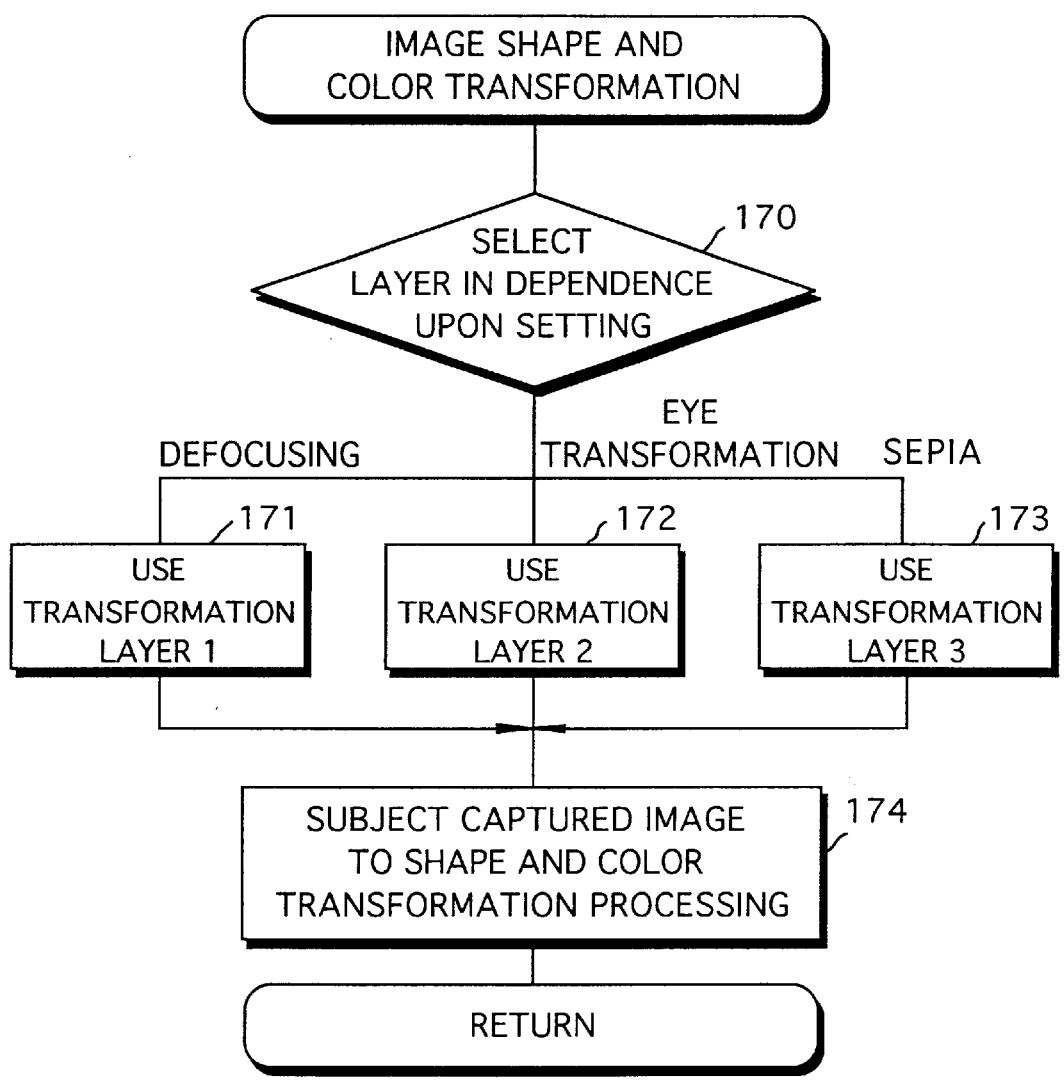
FIG. 37 is a flowchart illustrating the procedure of processing for transforming the shape of an image and the color of the image.

FIG. 37 is a flowchart illustrating the procedure of processing for transforming the shape and color of an image.

Processing for selecting a layer is executed before image shape and color transformation processing (step 170). Layer selection processing is executed in dependence upon the settings of the kind shown in FIGS. 28 to 34b described above. If image shape and color transformation processing set by the user is "DEFOCUSING", then layer 1 is selected (step 171). In a case where the transformation of "EYES" has been selected by the user, layer 2 is selected (step 172). In a case where the "SEPIA" color transformation processing has been selected, then layer 3 is selected (step 173).

In any case, when the layer is selected, a sample image stored beforehand and the captured user image are interchanged. The captured image is subjected to a shape transformation and color transformation (step 174) by the selected layer in accordance with the shape transformation method, transformation location, degree of shape transformation, color transformation method and degree of color transformation. The image thus transformed in shape and color is displayed on the display screen of the monitor display device 3 in the manner set forth above (see FIG. 12).

It goes without saying that in a case where a plurality of shape transformation and color transformation processing operations are executed, a plurality of layers will be selected in dependence upon the settings and the shape and color transformation processing will be executed repeatedly.

Figure 38:
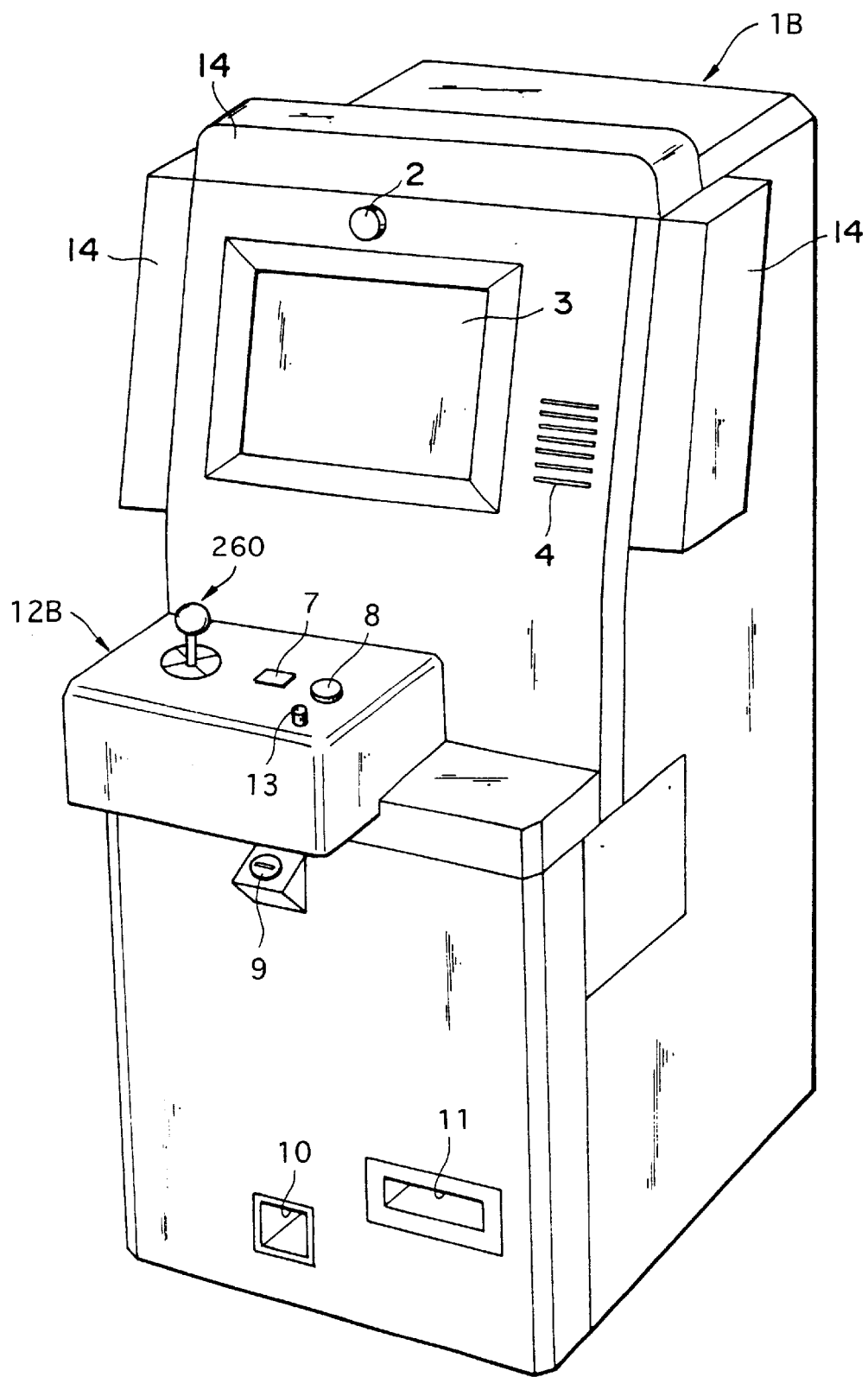
FIG. 38 is a perspective view of an image capture apparatus according to yet another embodiment.

FIG. 38 is a perspective view showing an image capture apparatus 1B according to another embodiment of the present invention. Components in FIG. 38 identical with those shown in FIG. 1 are designated by like reference characters and need not be described again.

Figure 39:
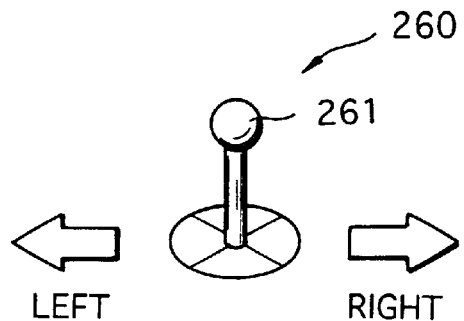
FIGS. 39 and 40 illustrate joysticks.
Figure 40:
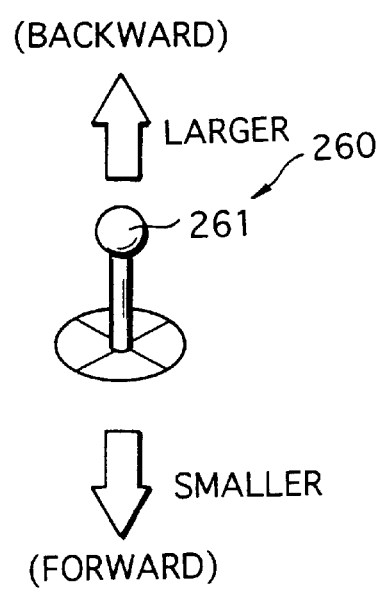

The control panel 12B in the image capture apparatus 1B shown in FIG. 38 is formed to have a joystick 260. FIGS. 39 and 40 are enlarged views of the joystick 260.

The joystick 260 has a knob 261 and can be tilted to left, right, forward and back. By operating the joystick 260, the position and size of the small circle C1 of the setting chart are set to thereby set the shape transformation method, degree of shape transformation, color transformation method and degree of color transformation.

Tilting the joystick 260 to the left revolves the small circle C1 of the setting chart clockwise about the center "O" of the large circle C2, and tilting the joystick 260 to the right revolves the small circle C1 counter-clockwise about the center "O" of the large circle C2. Further, tilting the joystick 260 backward (toward the image capture apparatus 1B when the user is standing in front of the apparatus and facing it) enlarges the size of the small circle C1, and tilting the joystick 260 forward reduces the size of the small circle C1.

It goes without saying that a signal representing the operation of the joystick 260 is input to the computer 20A.

Figure 41:
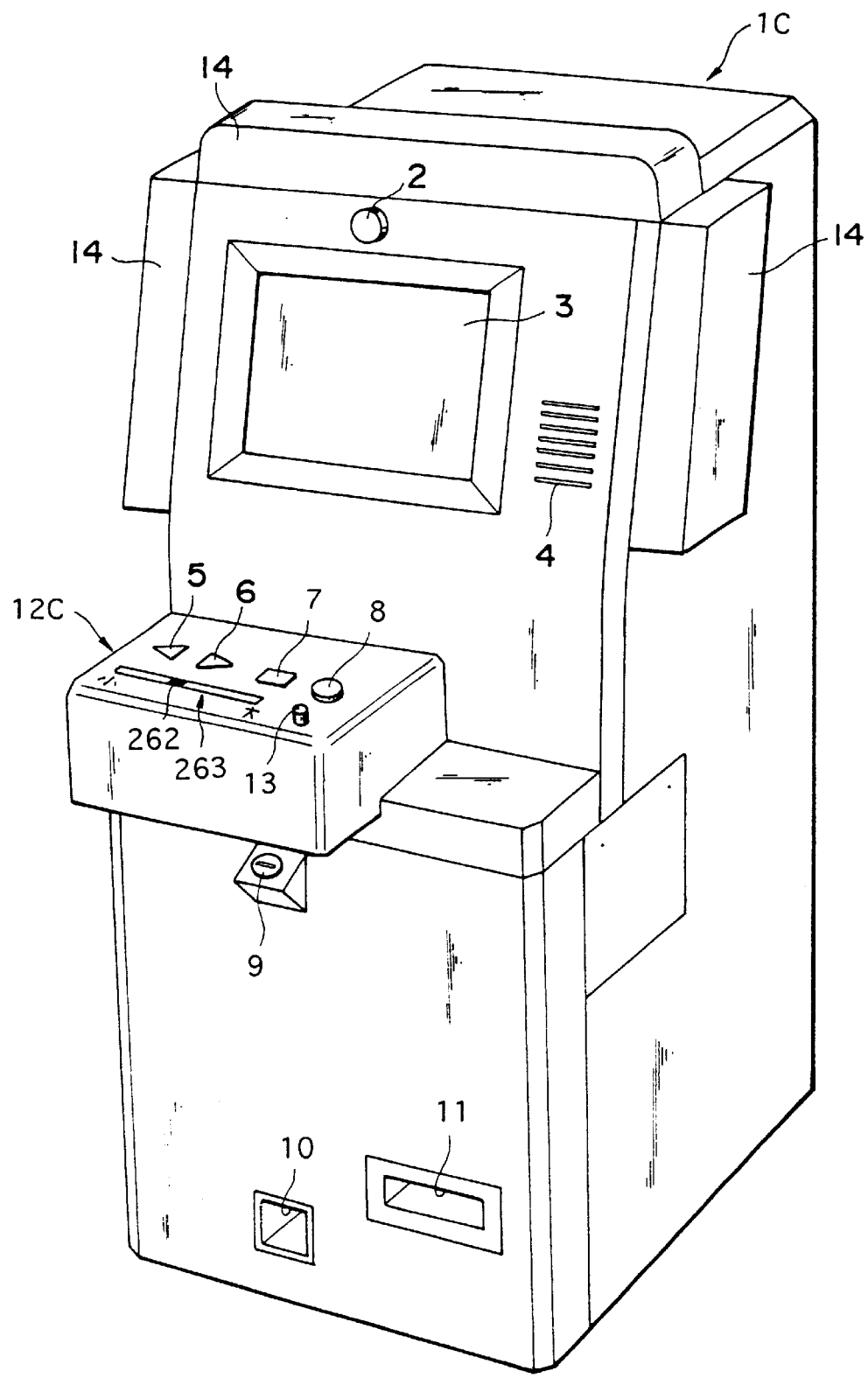
FIG. 41 is a perspective view of an image capture apparatus according to a further embodiment.
Figure 42:
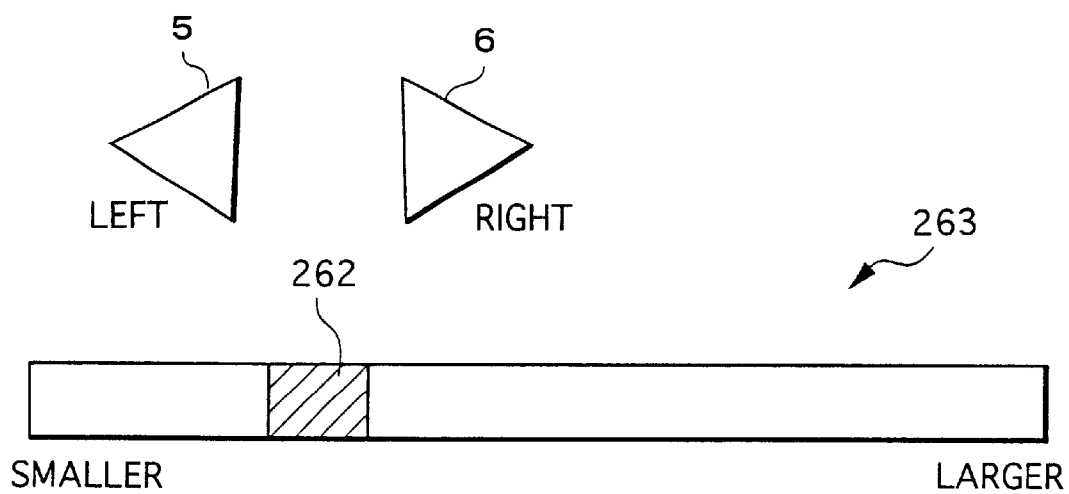
FIG. 42 illustrates a left button, right button and a slide bar.

FIG. 41 is a perspective view showing an image capture apparatus 1C according to another embodiment of the present invention. Components in FIG. 41 identical with those shown in FIG. 1 are designated by like reference characters and need not be described again. FIG. 42 illustrates the left button 5, right button 6 and a slide bar 263 formed on part of the control panel 12C of the image capture apparatus 1C shown in FIG. 41.

The image capture apparatus 1C shown in FIG. 41 is formed to have the slide bar 263 on the control panel 12C instead of the up button 15 and down button 16 shown in FIG. 23.

The slide bar 263 is formed to have a slider 262. The user can grasp the slider 262 and move it to the left or right. Moving the slider 262 to the left reduces the size of the small circle C1 of the setting chart, and moving the slider 262 to the right enlarges the size of the small circle C1 of the setting chart. Operating the left button 5, right button 6 and slide bar 263 make it possible to set the size and the position of the small circle C1.

By using the joystick 260, the left button 5, right button 6 and slide bar 263, first the position of the small circle C1 would be positioned diametrically of the large circle C2, then processing for positioning of the small circle C1 in the circumferential direction of the large circle C2 and for setting the size of the small circle C1 would be executed.

It goes without saying that signal representing the operation of the slide bar 263 would be input to the computer 20A.

Figure 43:
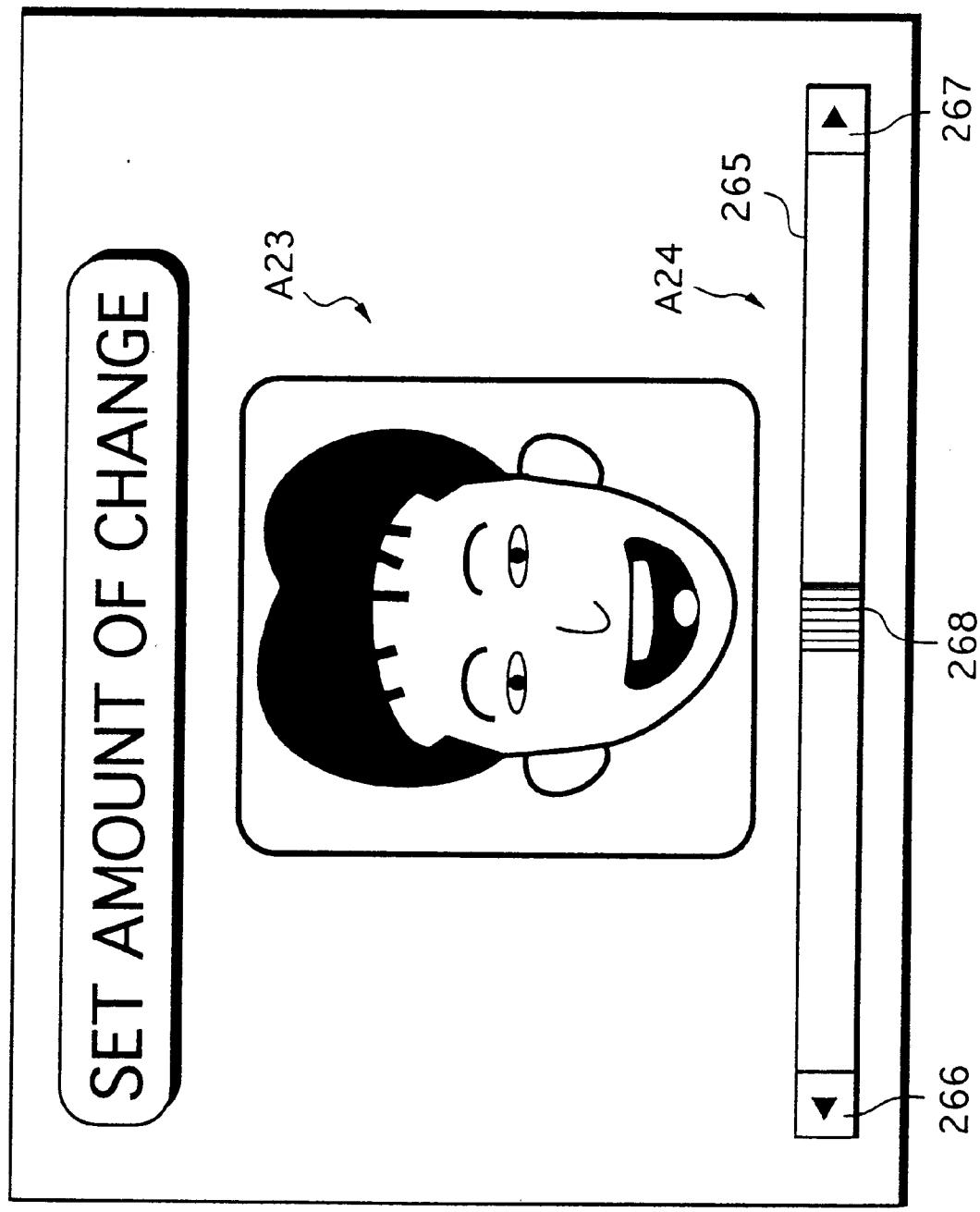
FIG. 43 shows an example of a display screen.
Figure 44:
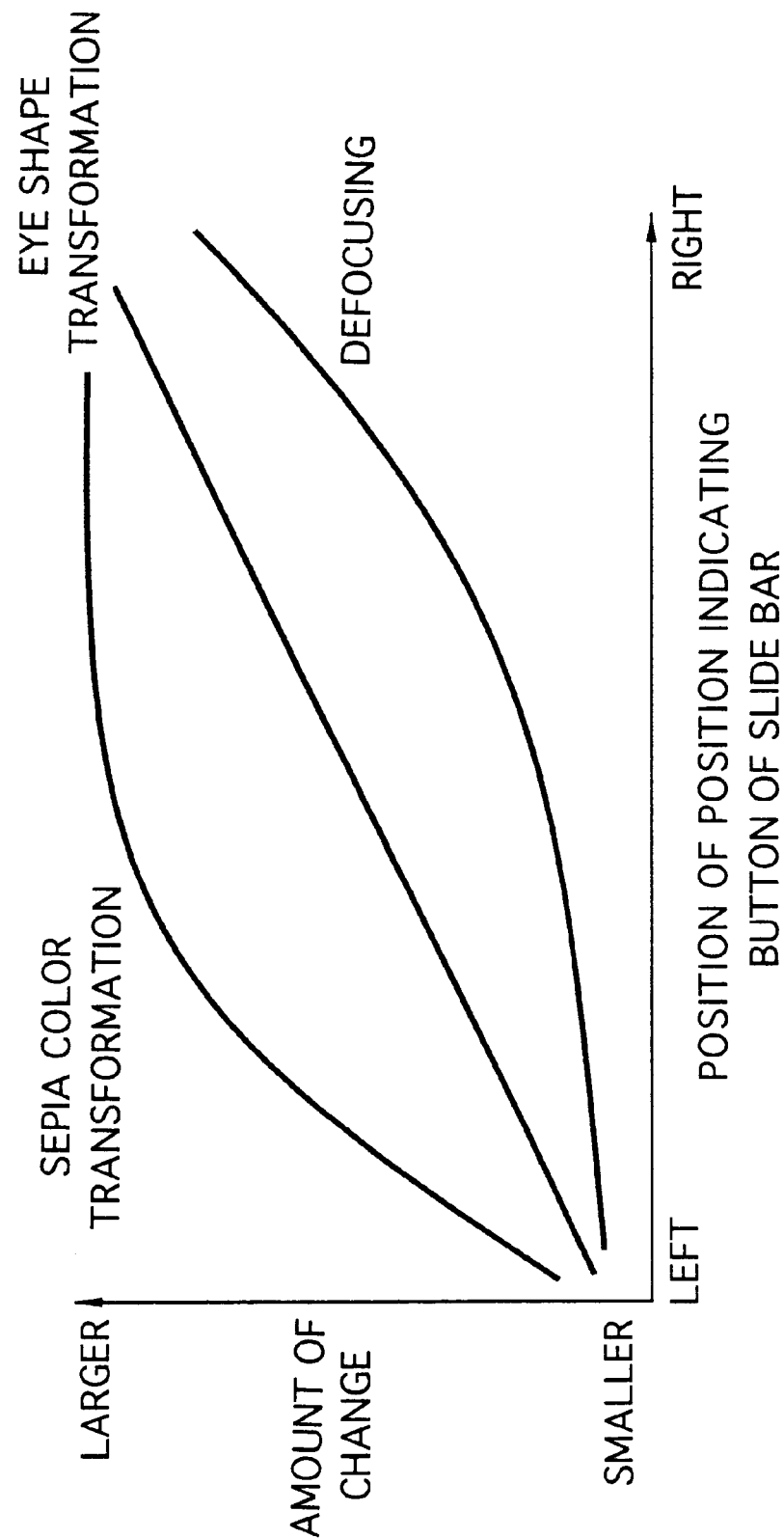
FIG. 44 shows the relationship between a position indicating button of a slide bar and amounts of change in image shape transformation and color transformation.

FIG. 43 illustrates an example of the display screen of monitor display device 3, and FIG. 44 illustrates the relationship between the position of the slider of the slide bar and the amount of change in the sepia color transformation, eye shape transformation and defocusing.

FIG. 43 is a setting screen used when the amount of change is set. The setting screen has an area A23 for displaying a captured image, and an area A24 for displaying a slide bar 265.

The slide bar 265 is formed to have a left button 266 on its left side and a right button 267 on its right side. A position indicating button 268 is formed between the left button 266 and the right button 267. The display screen of the monitor display device 3 is a touch-sensitive panel. The position indicating button 268 moves toward the left side when the user touches the left button 266 and to the right side when the user touches the right button 267.

The degree of the amount of change in sepia color transformation, the degree of eye shape transformation and the degree of defocusing are decided beforehand in dependence upon the position of the position indicating button 268 of slide bar 265, as shown in FIG. 44. This relationship is stored in the memory of the computer 20A. By moving the position of the position indicating button 268 of slide bar 265 (only one operating device need by manipulated), the degree of sepia color transformation, degree of eye shape transformation and degree of defocusing of the captured image can be set.

Figure 45:
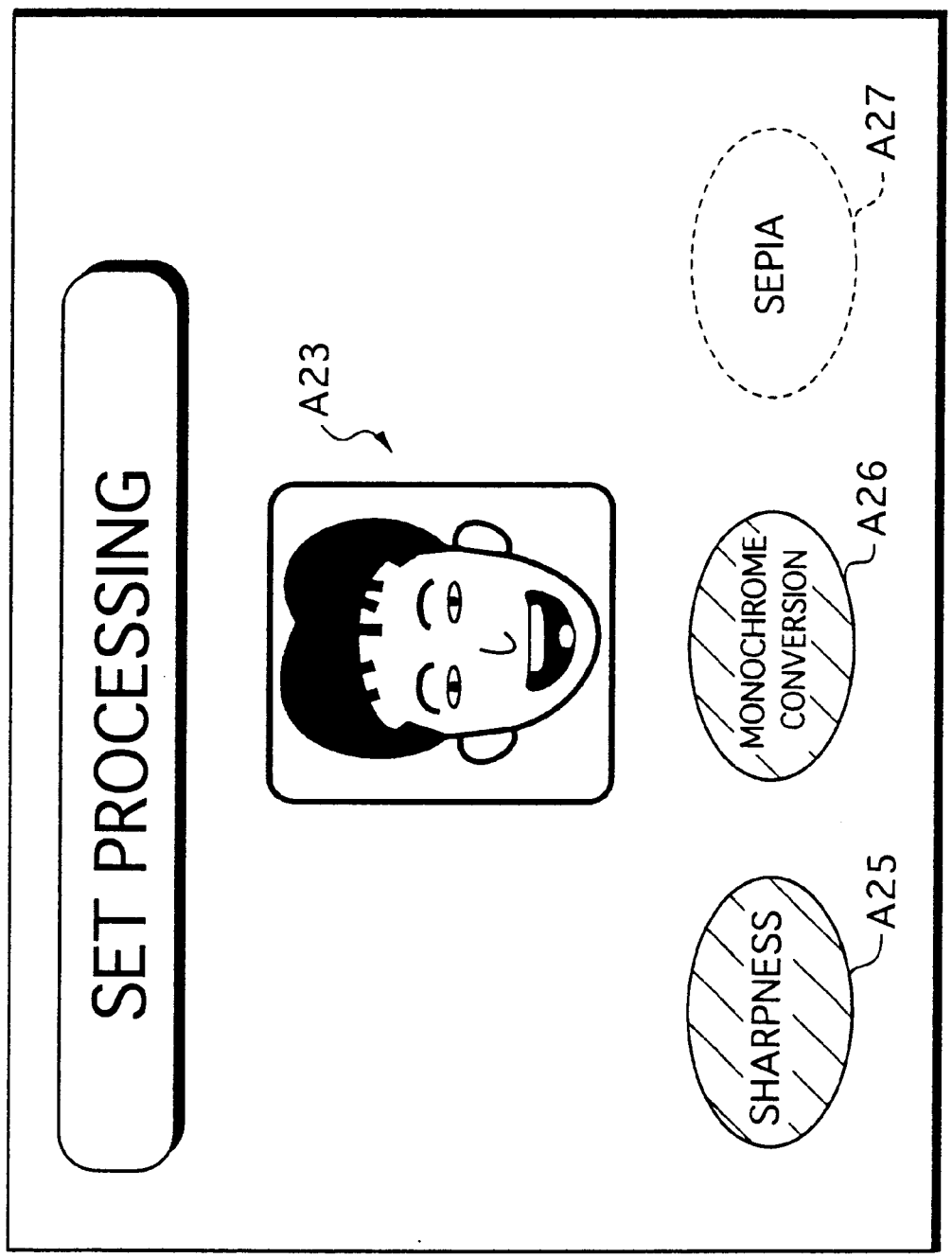
FIG. 45 shows an example of a display screen.

FIG. 45 illustrates the display screen of the monitor display device 3. This is a screen for configuring processing such as image shape transformation processing and image color transformation processing.

The setting screen has an area A23 which displays the captured image, as well as areas A25, A26 and A27 for setting purposes. The area A25 is touched by the user when the captured image is to be subjected to sharpness processing (edge emphasis processing). The area A26 is touched by the user when the captured image is to be converted to a monochrome image. The area A27 is touched by the user when the captured image is to be converted to the sepia color. It goes without saying that the monitor display device 3 is formed to have a touch-sensitive panel also for the display shown in FIG. 45.

A captured image cannot be converted to a monochrome image and converted to the sepia color as well. Processing which cannot be set to overlap other processing is determined in advance and stored in the memory of the computer 20A.

FIG. 46 illustrates the relationship between layers of an image-processing description file and an exclusion flag.

A layer for which the least significant digit of the exclusion flag is "0" is a layer that is capable of being set to overlap other layers at the same time. A layer for which the least significant digit of the exclusion flag is "1" is a layer that is not capable of being set simultaneously to overlap other layers whose least significant digit is "1". The least significant digits of the exclusion flags of the monochrome-conversion processing layer and sepia-color transformation layer are "1", meaning that these layers (processing operations) cannot be set simultaneously. When monochrome conversion processing has been set, sepia color transformation processing cannot be set at the same time. Conversely, when sepia color transformation processing has been set, monochrome conversion processing cannot be set at the same time.

If any of the areas A25, A26, A27 on the processing selection screen is touched by the user, the state of the display changes to indicate the fact that the touched area has been selected. (In FIG. 45, sharpness processing and monochrome conversion processing have been selected. The areas A25 and A26 are represented by hatching to indicate what has been selected.) Even if the user touches an area (in this example, the area is A27, which is for the sepia color transformation processing) that is for setting processing that cannot be set to simultaneously overlap processing that has been selected, the setting of this processing is ignored. (In FIG. 45, area A27 is indicated by the dashed line to show that the setting of this area will not be valid.)

Figure 47:
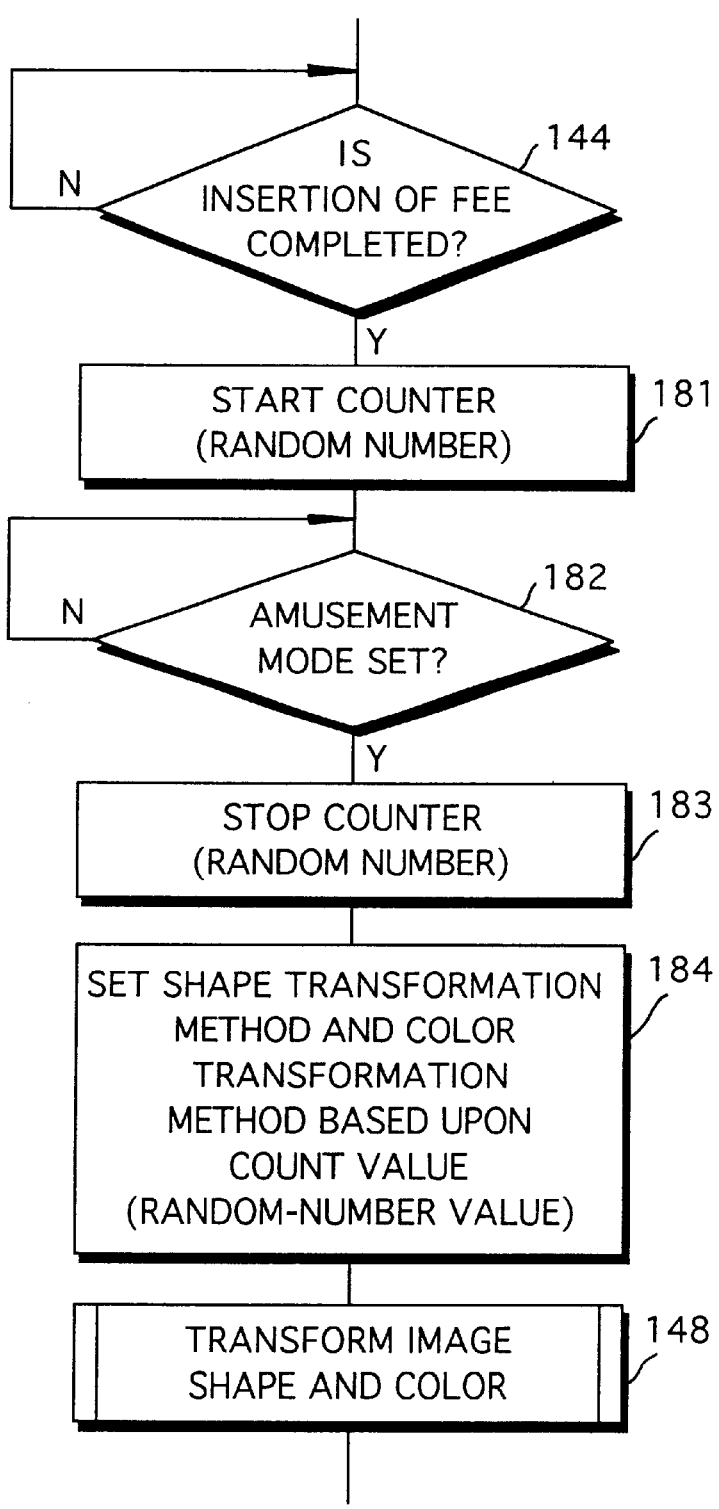
FIG. 47 is a flowchart illustrating part of the procedure of processing executed by the image capture apparatus.

FIG. 47 is a flowchart illustrating part of the procedure of processing executed by this image capture apparatus. Processing steps in FIG. 47 that are identical with processing steps shown in FIGS. 25 and 26 are designated by like step numbers and need not be described again. FIG. 48 shows the relationship between a count value in a counter incorporated in the computer 20A and methods of image shape transformation and image color transformation.

In the processing procedure shown in FIG. 47, an image shape transformation method and image color transformation method are set in dependence upon the value of the count registered by the counter. Defocusing processing is applied to the captured image during the time that the value of the count is between "0" and "aaa", sepia color transformation processing is applied to the captured image during the time that the value of the count is between "aaa" and "bbb", and eye shape transformation processing is applied to the captured image during the time that the value of the count is between "bbb" and "ccc".

In a case where the processing shown in FIG. 47 is executed, the user does not know what kind of image shape transformation and color transformation processing will be applied to the captured image, and therefore a mode setting button for verifying the intention of the user would be provided (an amusement button, described later).

If insertion of the fee has been completed ("YES" at step 144), counting by the counter begins (step 181). If an amusement mode is set by the user ("YES" at step 182), the counting operation of the counter stops and the value of the count is obtained when the amusement mode has been set (step 183). The image shape transformation method and image color transformation method regarding a captured image are set, based upon the value of the count obtained, using the relationship between the value of the count and the methods of image shape transformation and image color transformation (step 184). Processing for transforming the shape and color of the captured image is executed using the methods of image shape transformation and image color transformation that have been set (step 148).

In the example described above, the methods of image shape transformation and image color transformation are decided based upon the value of the count. However, an arrangement can be adopted in which the methods of image shape transformation and image color transformation are set using the random-number generator incorporated in the computer 20A. In this case also the operation of the random-number generator can be started in dependence upon the insertion of the fee, the operation of the random-number generator can be stopped when the amusement mode has been set and the random number obtained can be used.

Further, an arrangement may be adopted in which the methods of image shape transformation and image color transformation are set in dependence upon the time at which the image capture apparatus is used.

In this case, the methods of image shape transformation and image color transformation would be determined in advance for each time at which the image capture apparatus is utilized (i.e., at which the fee is inserted), as shown in FIG. 49. The time at which the image capture apparatus is utilized can be judged by making reference to the clock. Furthermore, rather than setting the methods of image shape transformation and image color transformation uniquely at each time, it is possible to adopt an arrangement in which the methods of image shape transformation and image color transformation are divided into groups of a plurality of methods each and the group is set on a per-time basis. In such case the methods of image shape transformation and image color transformation to be executed would be set from the set group. Of course, an arrangement may be adopted in which the processing of all methods of image shape transformation and image color transformation stipulated by a set group is executed.

Furthermore, the methods of image shape transformation and image color transformation that can be utilized may be set for each season (period). In this case, methods of image shape transformation and image color transformation would be determined beforehand for each season (period) in the manner shown in FIG. 50. In this case also an arrangement may be adopted in which the methods of image shape transformation and image color transformation that can be set for each season are divided into groups and the methods of image shape transformation and image color transformation are set from the set group.

Figure 51:
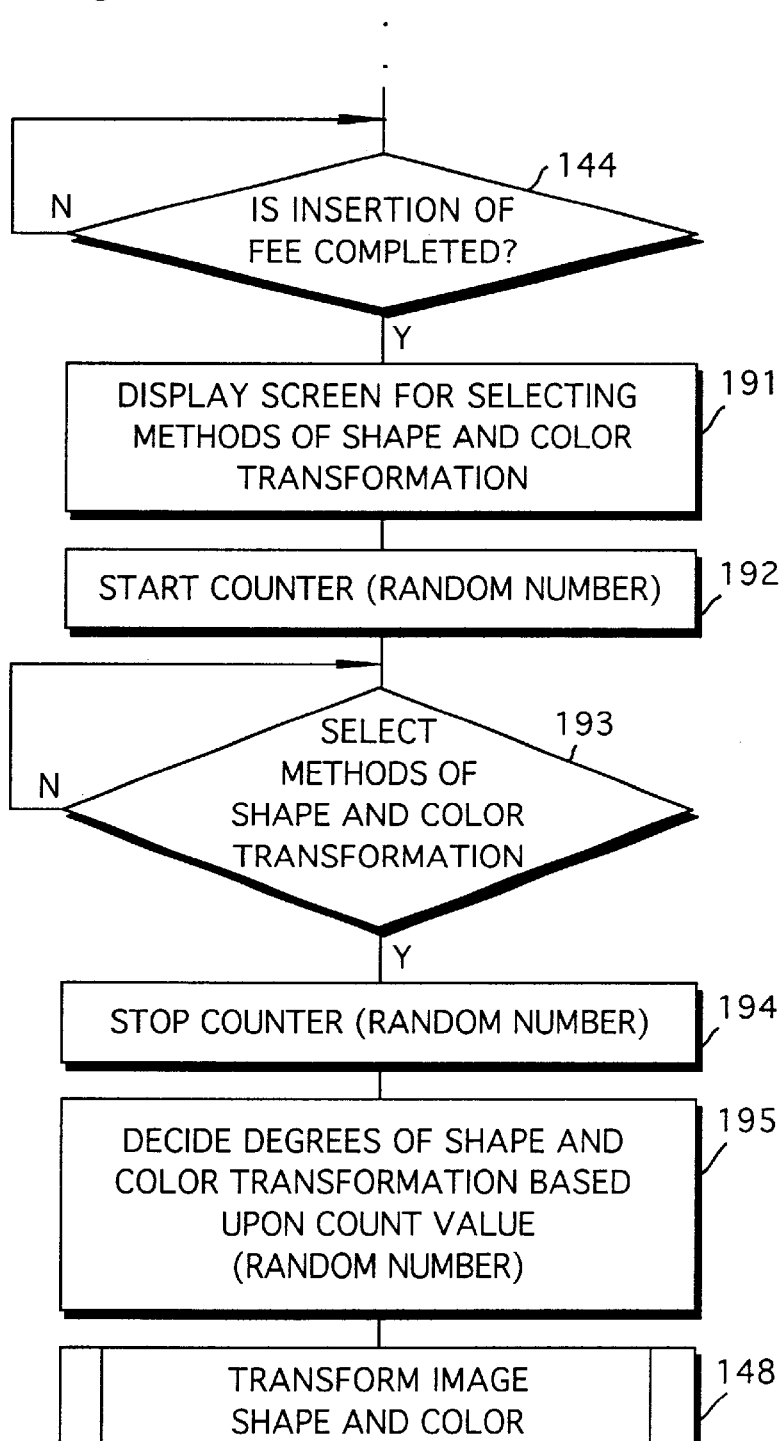
FIG. 51 is a flowchart illustrating part of the procedure of processing executed by the image capture apparatus.

FIG. 51 is a flowchart illustrating another processing procedure executed by this image capture apparatus, and FIG. 52 illustrates the relationship between the value of a count and degrees of methods of image shape transformation and image color transformation.

In this processing, the degrees of image shape transformation and image color transformation are decided by the value of a count or by the value of a random number. The degrees of image shape transformation and image color transformation are set in advance for each counted value (or random-number value) and stored in the memory of the computer 20A. For example, if the value of the count is "0" to "A", shape and color transformation is executed to the lowest degree. If the value of the count is "A" to "B", shape and color transformation is executed to the second lowest degree. If the value of the count is "B" to "C", shape and color transformation is executed to a third, or intermediate, degree. If the value of the count is "C" to "D", shape and color transformation is executed to a fourth degree. If the value of the count is "D" to "E", shape and color transformation is executed to the maximum degree.

If the fee is inserted by the user ("YES" at step 144), a screen for selecting the methods of shape transformation and color transformation is displayed on the display screen of the monitor display device 3 (step 191).

When the selection screen is displayed on the monitor display device 3, the counter of computer 20A starts counting (step 192). Alternatively, operation of the random-number starts.

By way of example, the selection screen includes areas for setting methods of shape transformation and color transformation, as shown in FIG. 45, and methods of shape transformation and color transformation are set by the user by touching these areas (step 193). When the setting of all methods of shape transformation and color transformation is completed, the OK button 7 is pressed.

When the setting of the methods of shape transformation and color transformation is finished and the OK button 7 is pressed, the counting operation of the counter stops (step 194). Alternatively, the operation of the random-number generator stops.

The degrees of image shape transformation and color transformation are decided by referring to the table of FIG. 52 based upon the counted value or random-number value obtained (step 195). Shape transformation and color transformation processing of the degrees decided is applied to the captured image (step 148).

In the example described above, the degrees of shape and color transformation are decided using the obtained count value or random-number value per se. However, an arrangement may be adopted in which degrees of shape and color transformation are decided using the value of the least significant digit of the count value or random-number value. Furthermore, an arrangement may be adopted in which the count value or random-number value is divided by the number of levels of degrees of shape transformation and color transformation available and the degrees of image shape transformation and color transformation are decided based upon the remainder.

As many apparently widely different embodiments of the present invention can be made without departing from the spirit and scope thereof, it is to be understood that the invention is not limited to the specific embodiments thereof except as defined in the appended claims.

What is claimed is:

1. An image capture apparatus comprising:
    an image capture device for capturing an image of interest;
    a setting device for setting at least one of processing relating to shape transformation and processing relating to color transformation of the image of interest captured by said image capture device;
    an image shape/color transformation device for subjecting the image of interest captured by said image capture device to the processing set by said setting device;
    an output device for outputting image data representing the image processed by said image shape/color transformation device;
    a command input device for inputting a processing command concerning processing relating to at least one of shape transformation and color transformation, said setting device making the setting based upon said processing command; and
    a storage device for storing, in advance, overlapped-setting prohibited processing, which is processing relating to shape transformation and color transformation that cannot be set to overlap other processing.

2. The apparatus according to claim 1, further comprising:
    a command-input invalidation device which invalidates, from commands entered from said command input device, input of a command calling for execution of a stored overlapped-setting prohibited processing.

3. The apparatus according to claim 2, wherein said command input device sets at least two processing operations, by a single operating device, of the processing relating to shape transformation and the processing relating to color transformation.

4. An image capture apparatus comprising:
    an image capture device for capturing an image of interest;
    a setting device for setting at least one of processing relating to shape transformation and processing relating to color transformation of the image of interest captured by said image capture device;
    an image shape/color transformation device for subjecting the image of interest captured by said image capture device to the processing set by said setting device;
    an output device for outputting image data representing the image processed by said image shape/color transformation device;
    command input device for inputting a processing command concerning at least one of processing relating to shape transformation and processing relating to color transformation, said setting device making the setting based upon the command input from said command input device;
    a storage device in which there is stored, in advance, overlapped-setting prohibited processing, which is processing in the processing relating to shape transformation and processing relating to color transformation that cannot be set to overlap other processing; and
    a command-input invalidation device which, on the basis of the overlapped-setting prohibited processing stored in advance, invalidates, from commands entered from said command input device, input of a command calling for execution of the overlapped-setting prohibited processing that has been stored in said storage device.

5. The apparatus according to claim 2, further comprising:
    a display unit for displaying, in each of prescribed areas, settable processing of the processing relating to shape transformation and processing relating to color transformation,
    wherein said command input device has coordinate input device for inputting coordinates on said area, and
    wherein at least one processing operating of processing relating to shape transformation and processing relating to color transformation is set based upon the coordinates input from said coordinate input device.

6. The apparatus according to claim 1, further comprising:
    a timer for measuring time,
    wherein on the basis of the result of time measurement by said timer, said setting device sets at least one of the processing relating to shape transformation and processing relating to color transformation of the image of interest captured by said image capture device.

7. The apparatus according to claim 1, further comprising:
    a random-number generating device for generating a random number,
    wherein on the basis of the random number generated by said random-number generating device, said setting device sets at least one of the processing relating to shape transformation and processing relating to color transformation of the image of interest captured by said image capture device.

8. An image capture method comprising:

capturing an image of interest;

setting at least one of processing relating to shape transformation and processing relating to color transformation of the captured image of interest;

applying the set processing to the captured image of interest;

outputting image data representing the processed image, inputting a processing command concerning at least one of processing relating to shape transformation and processing relating to color transformation;

storing, in advance, overlapped-setting prohibited processing which is processing in the processing relating to shape transformation and processing relating to color transformation that cannot be set to overlap other processing; and invalidating, on the basis of the overlapped-setting prohibited processing stored in advance, input of a command calling for execution of the overlapped-setting prohibited processing that has been stored.

9. An image transformation apparatus comprising:

an image capture device for capturing an image;

a setting device for setting processing relating to at least one of shape transformation and color transformation of said image;

an image shape/color transformation device for transforming said image based on the processing set by said setting device;

an output device for outputting image data representing the image transformed by said image shape/color transformation device;

a command input device for inputting a processing command concerning processing relating to at least one of shape transformation and color transformation, said setting device making the setting based upon said processing command; and a storage device for storing, in advance, overlapped-setting prohibited processing comprising processing relating to shape transformation and color transformation that cannot be set to overlap other processing.

10. The apparatus according to claim 9, further comprising:

a command-input invalidation device which invalidates, from commands entered from said command input device, input of a command calling for execution of a stored overlapped-setting prohibited processing.

* * * * *